() United States Patent  
Wu

(10) Patent No.: US 8,750,276 B2  
(45) Date of Patent: Jun. 10, 2014

(54) TRANSMISSION APPARATUS, RECEIVING APPARATUS, AND RADIO COMMUNICATION METHOD

(75) Inventor: Jianming Wu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 430 days.

(21) Appl. No.: 13/252,724

(22) Filed: Oct. 4, 2011

(65) Prior Publication Data

US 2012/0020236 A1 Jan. 26, 2012

Related U.S. Application Data

(63) Continuation of application No. PCT/JP2009/057614, filed on Apr. 15, 2009.

(51) Int. Cl.
*H04B 7/02* (2006.01)
*H04B 7/04* (2006.01)

(52) U.S. Cl.
CPC .............. *H04B 7/024* (2013.01); *H04B 7/0413* (2013.01)
USPC ................ 370/339; 370/350; 455/19; 455/82

(58) Field of Classification Search
USPC ............................... 370/339, 350; 455/19, 82
See application file for complete search history.

(56) References Cited

U.S. PATENT DOCUMENTS

2011/0228718 A1* 9/2011 Noh et al. ...................... 370/312

OTHER PUBLICATIONS

International Search Report issued for corresponding International Patent Application No. PCT/JP2009/057614, mailed Jun. 2, 2009.

Siavash M. Alamouti; "A Simple Transmit Diversity Technique for Wireless Communications"; IEEE Journal on Select Areas in Communications, vol. 16, No. 8, dated Oct. 1998.
3GPP TR 36.913 V8.0.0 (Jun. 2008); 3rd Generation Partnership Project; Technical Specification Group Radio Access Network; "Requirements for Further Advancements for E-UTRA (LTE-Advanced) (Release 8)"; Dated Jun. 2008.
Motorola; TSG-RAN WG1 #54, "Downlink Multiple Antenna Schemes for LTE-Advanced" R1-083228; Agenda Item: 12; Document for Discussion; Jeju, South Korea, Aug. 18-22, 2008.
Sharp; 3GPP TSG RAN WG1 Meeting #55bis; "Backward compatible design of downlink reference signals in LTE-Advanced"; R1-090023; Agenda Item: 12.5; Document for Discussion and Decision, Ljubljana, Slovenia, Jan. 12-16, 2009.
LG Electronics; 3GPP TSG RAN WG1 Meeting #55bis; "Downlink Reference Signal for Higher Order MIMO"; R1-090218; Agenda item: 12.5; Document for Discussion; Ljubljana, Slovenia, Jan. 12-17, 2009.

(Continued)

*Primary Examiner* — Hoon J Chung
(74) *Attorney, Agent, or Firm* — Myers Wolin, LLC

(57) ABSTRACT

A transmission apparatus includes (N+1) or more transmission antennas. A first receiving apparatus detects N or fewer transmission antennas from a received signal. A second receiving apparatus detects more than N transmission antennas from a received signal. The transmission apparatus uses a first radio resource for outputting a known signal from each of transmission antennas and uses a second radio resource for outputting a known signal from at least one of the transmission antennas. A timing difference between the first and second radio resources is smaller than or equal to a first determined difference and a frequency difference therebetween is smaller than or equal to a second determined difference. The first receiving apparatus estimates a channel state based on the known signal outputted on the first radio resource. The second receiving apparatus estimates a channel state based on the known signals outputted on the first and second radio resources.

9 Claims, 15 Drawing Sheets

(56) References Cited

OTHER PUBLICATIONS

NTT DOCOMO; 3GPP TSG RAN WG1 Meeting #55bis; "Support of DL Higher-Order MIMO Transmission in LTE-Advanced"; R1-090317; Agenda Item: 12.5; Document for Discussion and Decision; Ljubljana, Slovenia, Jan. 12-16, 2009.

Samsung; 3GPP TSG RAN WG1 #56; "DL RS Designs for Higher Order MIMO"; R1-090619; Document for Discussion and decision; Athens, Greece, Feb. 9-13, 2009.

Fujitsu; 3GPP TSG-RAN1 #56; "DL Reference Signal Design for 8×8 MIMO in LTE-Advanced"; R1-090706; Agenda Item: 12.4; Document for Discussion and Decision; Athens, Greece, Feb. 9-13, 2009.

Nortel; 3GPP TSG-RAN Working Group 1 Meeting #56; "Discussion on RS Design for High-order MIMO in LTE-A"; R1-090751; Agenda Item 12.4; Document for Discussions; Athens, Greece, Feb. 9-13, 2009.

Fujitsu; 3GPP TSG-RAN1 #56; An Efficient Reference Signal Design in LTE Advanced; R1-090949; Agenda Item: 12.2; Document for: Discussion and Decision; Athens, Greece, Feb. 9-13, 2009.

\* cited by examiner

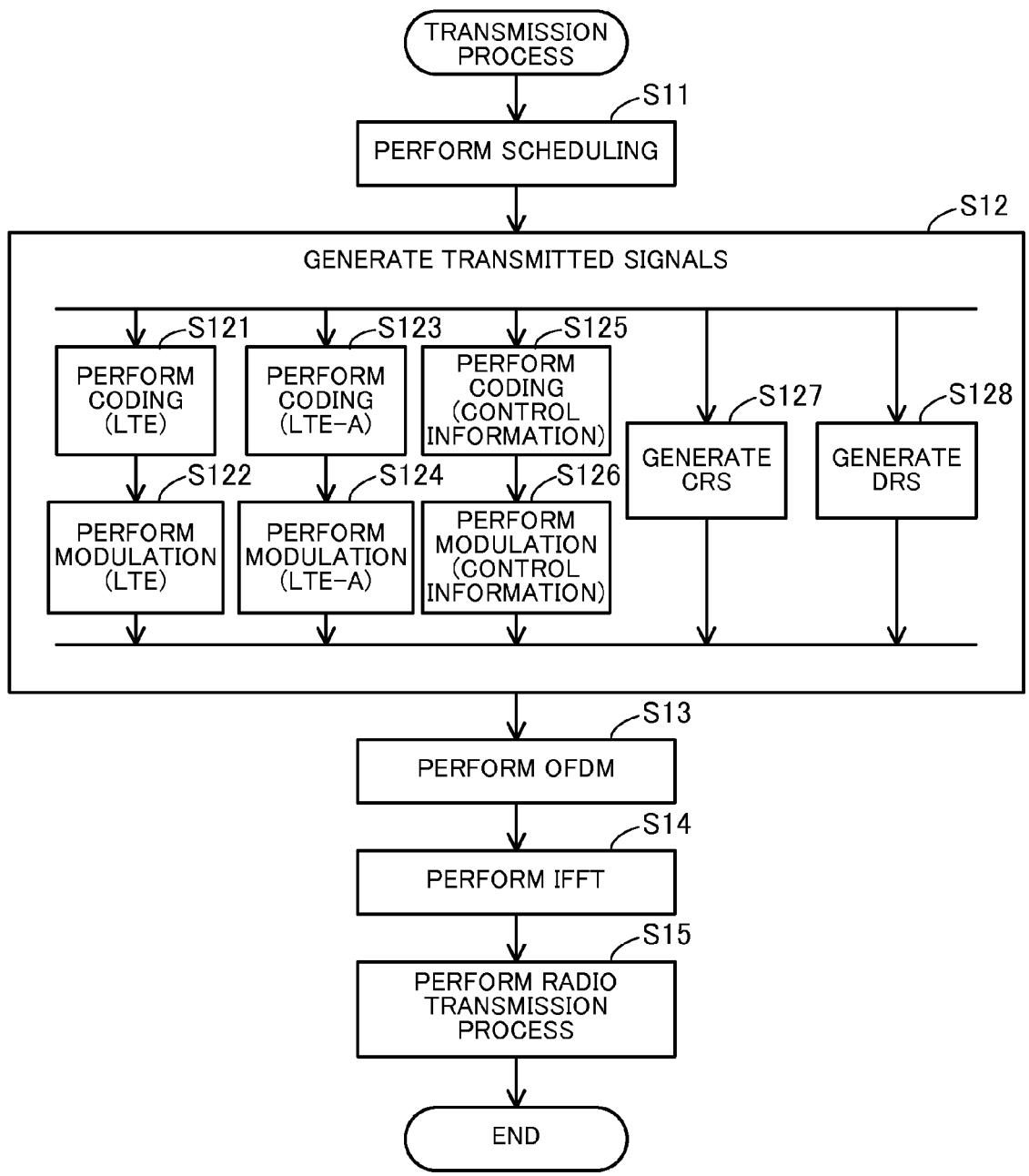

TRANSMISSION APPARATUS, RECEIVING APPARATUS, AND RADIO COMMUNICATION METHOD

This application is a continuing application of International Application PCT/JP2009/057614, filed on Apr. 15, 2009, now pending, the contents of which are herein wholly incorporated by reference.

FIELD

The embodiments discussed herein are related to a transmission apparatus, a receiving apparatus, and a radio communication method for performing radio communication.

BACKGROUND

At present radio communication systems such as mobile phone systems and radio LANs (Local Area Networks) are widely used. In some radio communication systems a transmission apparatus uses a plurality of transmission antennas in parallel for transmitting data to a receiving apparatus. With a mobile phone system based on a standard referred to as LTE (Long Term Evolution), for example, a radio base station can use a maximum of four transmission antennas in parallel. In addition, with a mobile phone system based on a standard referred to as LTE-A (LTE-Advanced) corresponding to the next generation of LTE, the possibility that a radio base station can use a maximum of eight transmission antennas in parallel is discussed (see, for example, 3GPP (3rd Generation Partnership Project), "Requirements for Further Advancements for E-UTRA", TR 36.913, V8.0.0, June 2008).

If a plurality of transmission antennas are used, a transmission apparatus may transmit a known signal referred to as a reference signal (RS) from each transmission antenna (see, for example, 3GPP (3rd Generation Partnership Project), "DL RS Designs for Higher Order MIMO", TSG-RAN WG1 #56, R1-090619, February 2009; 3GPP (3rd Generation Partnership Project), "DL Reference Signal Design for 8×8 MIMO in LTE-Advanced", TSG-RAN WG1 #56, R1-090706, February 2009; and 3GPP (3rd Generation Partnership Project), "An Efficient Reference Signal Design in LTE-Advanced", TSG-RAN WG1 #56, R1-090949, February 2009). A part of a radio resource is assigned for transmitting the known signal. A receiving apparatus detects the known signal included in a received signal. By doing so, the receiving apparatus can estimate a channel state for each transmission antenna. The result of estimating the channel state can be used for data demodulation, feedback of communication quality to the transmission apparatus, or the like.

By the way, if a transmission apparatus includes transmission antennas the number of which exceeds a maximum number which a receiving apparatus can detect, the problem of a transmission control method arises. In order to solve this problem, a control method referred to as virtual antenna mapping is proposed (see, for example, 3GPP (3rd Generation Partnership Project), "Downlink Multiple Antenna Schemes for LTE-Advanced", TSG-RAN WG1 #54, R1-083228, August 2008; and 3GPP (3rd Generation Partnership Project), "Discussion on RS Design for High-order MIMO in LTE-A", TSG-RAN WG1 #56, R1-090751, February 2009). With this control method two transmission antennas, for example, are treated as a pair. The two transmission antennas which form a pair transmit known signals by the use of the same resource region (at the same frequency and the same timing, for example) and transmit data which are equal in content (transmit data by CDD (Cyclic Delay Diversity), for example). As a result, a receiving apparatus recognizes the two physical transmission antennas as one virtual transmission antenna.

It is assumed that a transmission apparatus performs radio communication with plural types of receiving apparatus which differ in the maximum number of detectable transmission antennas. For example, a transmission apparatus includes eight transmission antennas and performs radio communication with both of a receiving apparatus which can detect a maximum of four transmission antennas and a receiving apparatus which can detect all the eight transmission antennas.

In this case, a known signal transmission method is problematic. One possible method is to separately transmit known signals according to receiving apparatus type. For example, both of known signals for detecting the eight transmission antennas and known signals for recognizing the eight transmission antennas as four virtual transmission antennas are transmitted. With this method, however, radio resources secured for transmitting known signals expand and radio resources used for transmitting data reduce. In the above example, eight resource regions corresponding to the eight transmission antennas and four resource regions corresponding to the four pairs may be secured.

SUMMARY

According to one aspect of the invention, there is provided a transmission apparatus for performing radio communication with a first type of receiving apparatus which can detect not more than N (N is an integer greater than or equal to one) transmission antennas from a received signal and a second type of receiving apparatus which can detect more than N transmission antennas from a received signal. The transmission apparatus includes: (N+1) or more transmission antennas including a first transmission antenna and a second transmission antenna; and a control section which assigns a radio resource to a signal outputted from each of the (N+1) or more transmission antennas, wherein: the control section exercises control so as to use a first radio resource for outputting known signals used by the first type of receiving apparatus and the second type of receiving apparatus from the first transmission antenna and the second transmission antenna and to use a second radio resource for outputting a known signal used by the second type of receiving apparatus from at least one of the first transmission antenna and the second transmission antenna; and a timing difference between the first radio resource and the second radio resource is smaller than or equal to a first determined difference and a frequency difference between the first radio resource and the second radio resource is smaller than or equal to a second determined difference.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a flow chart of a transmission process performed by the radio base station.

DESCRIPTION OF EMBODIMENTS

Embodiments will now be described in detail with reference to the drawings.

Figure 1:
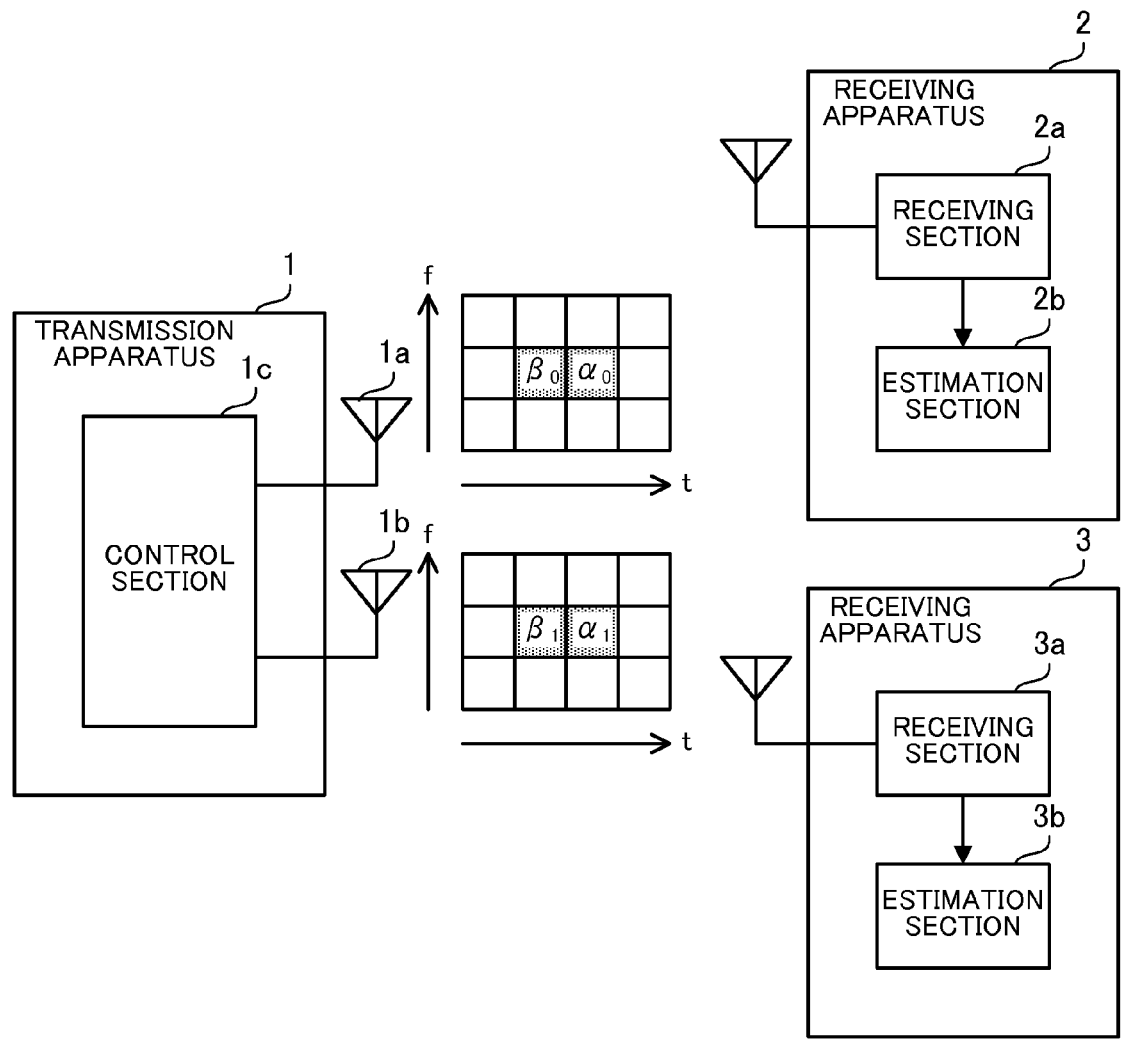
FIG. 1 illustrates an example of a transmission apparatus and a receiving apparatus.

FIG. 1 illustrates an example of a transmission apparatus and a receiving apparatus. A transmission apparatus 1 can perform radio communication with receiving apparatus 2 and 3. The whole or a part of a resource region defined by a time axis and a frequency axis can be used as a radio resource for radio communication.

The transmission apparatus 1 includes (N+1) or more transmission antennas (N is an integer greater than or equal to one) including transmission antennas 1a and 1b and a control section 1c. Each of the transmission antennas 1a and 1b outputs a radio signal under the control of the control section 1c. The transmission antennas 1a and 1b can output the same signal or different signals. The control section 1c assigns a resource region to a signal outputted from each of the plurality of transmission antennas including the transmission antennas 1a and 1b. For example, the control section 1c performs scheduling of transmitted signals such as a data signal a destination of which is the receiving apparatus 2 and a data signal and a known signal a destination of which is the receiving apparatus 3.

The receiving apparatus 2 can detect not more than N transmission antennas from a received signal. That is to say, the receiving apparatus 2 cannot physically recognize all of the transmission antennas included in the transmission apparatus 1. The receiving apparatus 2 includes a receiving section 2a and an estimation section 2b. The receiving section 2a receives a radio signal outputted from each of the transmission antennas 1a and 1b included in the transmission apparatus 1. For example, the receiving section 2a performs processes such as an analog-to-digital conversion and a Fourier transform. On the basis of the radio signal received by the receiving section 2a, the estimation section 2b estimates a channel state. However, when the estimation section 2b performs channel estimation, the transmission antennas 1a and 1b are recognized as one virtual transmission antenna.

The receiving apparatus 3 can detect more than N transmission antennas from a received signal. That is to say, there is a possibility that the receiving apparatus 3 can physically recognize all of the transmission antennas included in the transmission apparatus 1. The receiving apparatus 3 includes a receiving section 3a and an estimation section 3b. The receiving section 3a receives a radio signal outputted from each of the transmission antennas 1a and 1b included in the transmission apparatus 1. For example, the receiving section 3a performs processes such as an analog-to-digital conversion and a Fourier transform. On the basis of the radio signal received by the receiving section 3a, the estimation section 3b estimates a channel state for each of the transmission antennas 1a and 1b.

The control section 1c included in the transmission apparatus 1 controls output of known signals from the transmission antennas 1a and 1b. To be concrete, the control section 1c exercises control so as to use a first radio resource for outputting a known signal $\alpha_0$ from the transmission antenna 1a and outputting a known signal $\alpha_1$ from the transmission antenna 1b and to use a second radio resource for outputting a known signal $\beta_0$ from the transmission antenna 1a and outputting a known signal $\beta_1$ from the transmission antenna 1b. However, the control section 1c may exercise control so as not to transmit one of the known signals $\beta_0$ and $\beta_1$ ($\beta_1$=0, for example).

The first radio resource and the second radio resource are set so that a timing difference between them will be smaller than or equal to a first determined difference (difference of several symbols, for example), and so that a frequency difference between them will be smaller than or equal to a second determined difference (difference of several subcarriers, for example). It is desirable that the first radio resource and the second radio resource should be as close to each other as possible (for example, a timing difference between them is one symbol and a frequency difference between them is one subcarrier). It is possible to make the two radio resources adjacent to each other on the time axis or the frequency axis. The control section 1c may exercise control so that distance (for example, the sum of a timing difference and a frequency difference) on the resource region defined by the timing difference and the frequency difference will be smaller than or equal to a determined threshold. Furthermore, the first radio resource and the second radio resource may be set so that they will not overlap on the resource region. In addition, the first radio resource and the second radio resource may be allowed to overlap on the resource region by code-multiplexing a known signal.

The known signal $\alpha_0$ and the known signal $\alpha_1$ may be the same or different from each other. In addition, the known signal $\alpha_0$ and the known signal $\beta_0$ may be the same or different from each other. For example, these known signals may satisfy $\beta_0=\alpha_1^*$ and $\beta_1=-\alpha_0^*$ (* indicates a complex conjugate operation). Furthermore, the magnitude (absolute values) of all these known signals may be one. For example, $\alpha_0=\alpha_1=\beta_0=1$ and $\beta_1=-1$ are possible.

As a result, each of the receiving section 2a of the receiving apparatus 2 and the receiving section 3a of the receiving apparatus 3 receives by the first radio resource a signal in which the known signal $\alpha_0$, the known signal $\alpha_1$, and noise are superimposed. Each of the receiving section 2a of the receiving apparatus 2 and the receiving section 3a of the receiving apparatus 3 receives by the second radio resource a signal in which the known signal $\beta_0$, the known signal $\beta_1$, and noise are superimposed. A known signal may be, for example, a common reference signal (CRS) which both of the receiving apparatus 2 and 3 can detect.

The estimation section 2b of the receiving apparatus 2 extracts the signal received by the first radio resource from a received signal, and performs channel estimation. At this time there is no need for the estimation section 2b to refer to the signal received by the second radio resource. As a result, a channel state is estimated with the transmission antennas 1a and 1b considered as one virtual transmission antenna. On the other hand, the estimation section 3b of the receiving apparatus 3 extracts the signal received by the first radio resource and the signal received by the second radio resource from a received signal, and performs channel estimation. As a result, a channel state is estimated for each of the transmission antennas 1a and 1b.

For example, the estimation section 3b may consider a channel state for the first radio resource to be equal to a channel state for the second radio resource. In this case, the estimation section 3b can perform channel estimation for each of the transmission antennas 1a and 1b by a linear operation (such as an operation for finding the solution of simultaneous equations). The first radio resource and the second radio resource should are close to each other, so considering a channel state for the first radio resource to be equal to a channel state for the second radio resource will not cause a serious deterioration in the accuracy of channel estimation.

The results of estimation by the estimation section 2b of the receiving apparatus 2 and the estimation section 3b of the receiving apparatus 3 can be used for, for example, channel compensation at received data demodulation time. The results of estimation can also be used for the feedback of a communication state from the receiving apparatus 2 and 3 to the transmission apparatus 1. A channel state indicator (CSI), for example, may be fed back. On the basis of the feedback from the receiving apparatus 2 and 3, the transmission apparatus 1 can perform scheduling of data signals.

Each of the receiving apparatus 2 and 3 may perform channel estimation regularly or irregularly (for example, at the time when it detects that data a destination of which is it is included in a received signal). In addition, each of the receiving apparatus 2 and 3 may inform the transmission apparatus of its receiving apparatus type (whether or not it can recognize more than N transmission antennas) before receiving data. Only if a receiving apparatus that can recognize more than N transmission antennas is included in receiving apparatus with which the transmission apparatus 1 communicates, the transmission apparatus 1 may transmit the known signals $\beta_0$ and $\beta_1$ by the use of the second radio resource.

With this radio communication method the transmission apparatus 1 outputs known signals from the transmission antennas 1a and 1b by the use of the first radio resource and outputs a known signal from at least one of the transmission antennas 1a and 1b by the use of the second radio resource close to the first radio resource. The receiving apparatus 2 estimates a channel state on the basis of the known signals received by the use of the first radio resource. In addition, the receiving apparatus 3 estimates a channel state on the basis of the known signals received by the use of the first radio resource and the known signal received by the use of the second radio resource.

As a result, there is no need for the transmission apparatus 1 to transmit known signals separately to the receiving apparatus 2 which can recognize not more than N transmission antennas and the receiving apparatus 3 which can recognize (N+1) or more transmission antennas. That is to say, the known signal $\alpha_0$ and $\alpha_1$ received by the use of the first radio resource can be used by both of the two types of receiving apparatus. This prevents radio resources used for transmitting known signals from increasing and prevents radio resources used for transmitting data from decreasing. Accordingly, radio resources can be used efficiently.

In the above description the receiving apparatus 2 can recognize the two transmission antennas 1a and 1b as one virtual transmission antenna. However, this can be generalized. That is to say, it is possible that the receiving apparatus 2 can recognize M (M is an integer greater than or equal to two) transmission antennas as one virtual transmission antenna. In order to realize this receiving apparatus 2, the following method, for example, is possible.

That is to say, the control section 1c of the transmission apparatus 1 selects M radio resources. The control section 1c then exercises control so as to use a first radio resource of the M radio resources for outputting known signals used by the receiving apparatus 2 and 3 from the M transmission antennas. The control section 1c also exercises control so as to use a second radio resource of the M radio resources for outputting a known signal used by the receiving apparatus 3 from at least one of the M transmission antennas. Similarly, the control section 1c exercises control so as to use each of the third through Mth radio resources for outputting a known signal used by the receiving apparatus 3 from at least one of the M transmission antennas.

In this case, it is desirable that the M radio resources selected should be as close to one another as possible on the resource region defined by the time axis and the frequency axis. For example, it is desirable that these M radio resources should be within a determined time range (several symbols, for example) and a determined frequency range (several subcarriers, for example).

An example in which the above radio communication method is applied to a mobile telecommunication system will now be described in further detail. To be concrete, the transmission method by the above transmission apparatus 1 is applied to a radio base station and the receiving method by the above receiving apparatus 2 and 3 is applied to a mobile station. However, the above radio communication method can be applied to a system (such as a fixed radio communication system or an ad-hoc radio communication system) other than the mobile telecommunication system.

Figure 2:
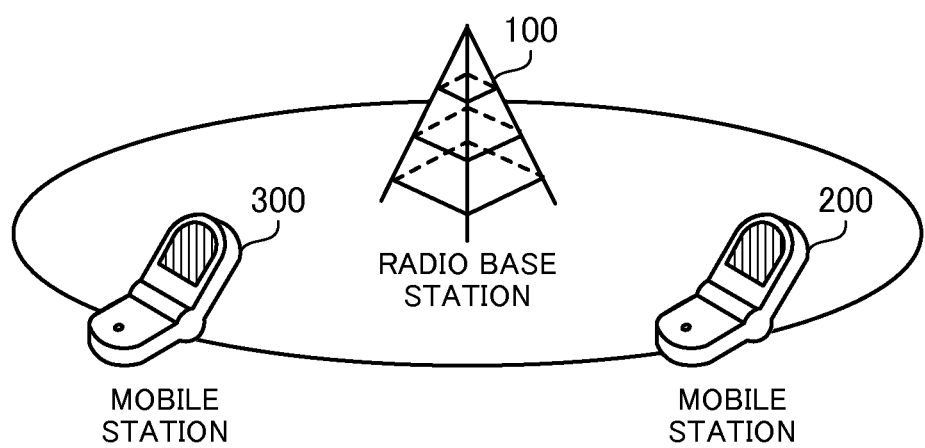
FIG. 2 illustrates the entire structure of a mobile telecommunication system.

FIG. 2 illustrates the entire structure of a mobile telecommunication system. A mobile telecommunication system according to this embodiment includes a radio base station 100 and mobile stations 200 and 300.

The radio base station 100 is a radio communication apparatus which can perform radio communication in parallel with a plurality of mobile stations including the mobile stations 200 and 300. The radio base station 100 includes 8 transmission antennas. When the radio base station 100 acquires user data a destination of which is the mobile station 200 or 300, the radio base station 100 performs coding and modulation and performs radio transmission by using a maximum of eight transmission antennas in parallel.

Each of the mobile stations 200 and 300 is a radio terminal apparatus which can gain access to the radio base station 100 for performing radio communication. A portable telephone, a personal digital assistant, or the like is used as each of the mobile stations 200 and 300. The mobile station 200 can recognize a maximum of four transmission antennas from a received signal and perform channel estimation. The mobile station 300 can recognize a maximum of eight transmission antennas from a received signal and perform channel estimation. Each of the mobile stations 200 and 300 demodulates and decodes user data a destination of which is it by the use of the result of channel estimation.

The mobile telecommunication system according to this embodiment can be realized as a mobile phone system based on the LTE standard and the LTE-A standard. In this case, the radio base station 100 can perform communication based both on the LTE standard and on the LTE-A standard. The mobile station 200 performs communication based on the LTE standard. The mobile station 300 performs communication based on the LTE-A standard. Assuming that the LTE standard and the LTE-A standard are adopted, communication (downlink communication) from the radio base station 100 to the mobile station 200 or 300 will now be described in detail. Descriptions of communication (uplink communication) from the mobile station 200 or 300 to the radio base station 100 will be omitted according to circumstances.

Figure 3:
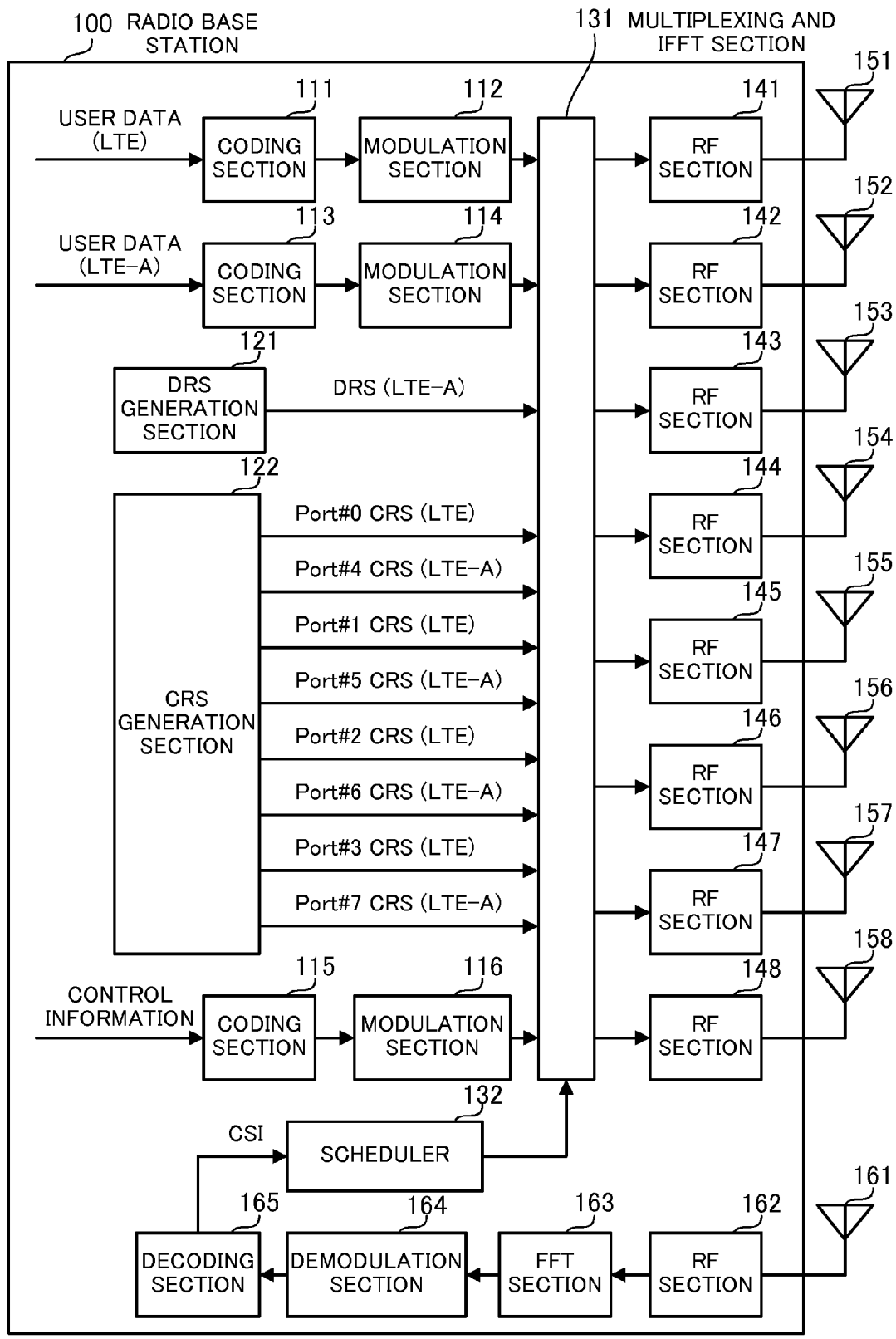
FIG. 3 is a block diagram of a radio base station.

FIG. 3 is a block diagram of the radio base station. The radio base station 100 includes coding sections 111, 113, and 115, modulation sections 112, 114, and 116, a DRS generation section 121, a CRS generation section 122, a multiplexing and IFFT section 131, a scheduler 132, RF sections 141 through 148, transmission antennas 151 through 158, a receiving antenna 161, an RF section 162, an FFT section 163, a demodulation section 164, and a decoding section 165.

If user data a destination of which is the mobile station 200 based on the LTE standard is stored in a buffer memory (not illustrated), then the coding section 111 extracts the user data from the buffer memory. The coding section 111 then performs error-correction coding on the user data by the use of a determined coding scheme or a coding scheme selected according to the communication state of the mobile station 200. Convolutional coding, turbo coding, low density parity check (LDPC) coding, or the like can be used as a coding scheme. The coding section 111 outputs coded data obtained to the modulation section 112.

The modulation section 112 digital-modulates the coded data acquired from the coding section 111 by the use of a determined modulation scheme or a modulation scheme selected according to the communication state of the mobile station 200. A multilevel modulation scheme, such as QPSK (Quadrature Phase Shift Keying), 16QAM (Quadrature Amplitude Modulation), or 64QAM, can be used as a modulation scheme. The modulation section 112 outputs a modulated signal obtained to the multiplexing and IFFT section 131.

If user data a destination of which is the mobile station 300 based on the LTE-A standard is stored in a buffer memory (not illustrated), then the coding section 113 extracts the user data from the buffer memory. The coding section 113 then performs error-correction coding on the user data by the use of a determined coding scheme or a coding scheme selected according to the communication state of the mobile station 300. The coding section 113 outputs coded data obtained to the modulation section 114.

The modulation section 114 digital-modulates the coded data acquired from the coding section 113 by the use of a determined modulation scheme or a modulation scheme selected according to the communication state of the mobile station 300. The modulation section 114 then outputs a modulated signal obtained to the multiplexing and IFFT section 131.

When the coding section 115 acquires control information to be transmitted to the mobile station 200 or 300, the coding section 115 performs error-correction coding on the control information by the use of a determined coding scheme. The control information to be transmitted includes the modulation scheme and coding scheme adopted for modulating and coding the user data, information for specifying a resource region including the user data, information for giving instructions to feed back communication quality on a downlink, and the like. The coding section 115 outputs coded information obtained to the modulation section 116.

The modulation section 116 digital-modulates the coded information acquired from the coding section 115 by the use of a determined modulation scheme. The modulation section 116 then outputs a modulated signal obtained to the multiplexing and IFFT section 131.

In a determined case (such as the case where beam forming is performed or the case where demodulation is performed at the time of user data for LTE-A being transmitted), the DRS generation section 121 generates a dedicated reference signal (DRS). A dedicated reference signal is assigned to the mobile station 300 based on the LTE-A standard. A dedicated reference signal, together with user data, is transmitted to the mobile station 300. The DRS generation section 121 outputs the DRS generated to the multiplexing and IFFT section 131.

The CRS generation section 122 generates a common reference signal (CRS) for each of ports #0 through #7. The CRSes for the ports #0 through #3 are referred to both by the mobile station 200 based on the LTE standard and by the mobile station 300 based on the LTE-A standard. The CRSes for the ports #4 through #7 are referred to by the mobile station 300 based on the LTE-A standard. The CRS generation section 122 outputs the CRSes generated to the multiplexing and IFFT section 131.

For example, if the transmission antennas 151 and 152 are considered as one antenna, the port #0 functions as a virtual transmission port. If the transmission antennas 153 and 154 are considered as one antenna, the port #1 functions as a virtual transmission port. If the transmission antennas 155 and 156 are considered as one antenna, the port #2 functions as a virtual transmission port. If the transmission antennas 157 and 158 are considered as one antenna, the port #3 functions as a virtual transmission port.

If the transmission antennas 151 and 152 are considered as separate antennas, the port #4 means a transmission port which increases compared with the case where the transmission antennas 151 and 152 are considered as one antenna. If the transmission antennas 153 and 154 are considered as separate antennas, the port #5 means a transmission port which increases compared with the case where the transmission antennas 153 and 154 are considered as one antenna. If the transmission antennas 155 and 156 are considered as separate antennas, the port #6 means a transmission port which increases compared with the case where the transmission antennas 155 and 156 are considered as one antenna. If the transmission antennas 157 and 158 are considered as separate antennas, the port #7 means a transmission port which increases compared with the case where the transmission antennas 157 and 158 are considered as one antenna.

The mobile station 200 based on the LTE standard recognizes the ports #0 through #3. If only the ports #0 through #3 are recognized (by the mobile station 200), then it may safely be said that the ports #0 through #3 are "virtual" ports. On the other hand, the mobile station 300 based on the LTE-A standard recognizes the ports #0 through #7. If the ports #0 through #7 are recognized (by the mobile station 300), then it may safely be said that the ports #0 through #7 are "physical" ports. In the example of FIG. 3, a transmission antenna is paired with a transmission antenna adjacent thereto in order to form a virtual transmission antenna. However, a transmission antenna may be paired with a transmission antenna apart therefrom. In addition, three or more transmission antennas can be used for forming one virtual transmission antenna.

In this embodiment a CRS which the mobile station 200 uses for recognizing the port #0 is referred to as a "CRS for the port #0" and a CRS which the mobile station 300 uses, in addition to the CRS for the port #0, for recognizing both the ports #0 and #4 is referred to as a "CRS for the port #4". This is the same with the relationship between a CRS for the port #1 and a CRS for the port #5, the relationship between a CRS for the port #2 and a CRS for the port #6, and the relationship between a CRS for the port #3 and a CRS for the port #7.

On the basis of scheduling results of which the scheduler 132 informs the multiplexing and IFFT section 131, the multiplexing and IFFT section 131 maps the signals acquired from the modulation sections 112, 114, and 116, the DRS generation section 121, and the CRS generation section 122 to a frequency domain. In addition, the multiplexing and IFFT section 131 performs an inverse Fourier transform on the frequency domain signals to generate time domain signals. For example, the multiplexing and IFFT section 131 performs an inverse fast Fourier transform (IFFT). However, the multiplexing and IFFT section 131 may use a transform algorithm other than an IFFT. The multiplexing and IFFT section 131 then outputs signals to be outputted from the transmission antennas 151 through 158 to the RF sections 141 through 148 respectively.

The scheduler 132 performs scheduling of user data a destination of which is the mobile station 200 or 300, control information, a DRS, and a CRS. The scheduler 132 performs scheduling by, for example, the frame or subframe. When the scheduler 132 performs scheduling of user data, the scheduler 132 refers to a channel state indicator (CSI) acquired from the decoding section 165, and determines a frequency band suitable for transmitting the user data. In addition, the scheduler 132 exercises control so that the CRS will be mapped to a determined area in a resource region. However, proper switching of a plurality of mapping patterns to be used may be performed. The scheduler 132 then informs the multiplexing and IFFT section 131 of scheduling results.

The RF sections 141 through 148 perform radio transmission processes on the signals after the IFFT acquired from the multiplexing and IFFT section 131, and output signals obtained to the transmission antennas 151 through 158 respectively. To be concrete, the RF section 141 corresponds to the transmission antenna 151. The RF section 142 corresponds to the transmission antenna 152. The RF section 143 corresponds to the transmission antenna 153. The RF section 144 corresponds to the transmission antenna 154. The RF section 145 corresponds to the transmission antenna 155. The RF section 146 corresponds to the transmission antenna 156. The RF section 147 corresponds to the transmission antenna 157. The RF section 148 corresponds to the transmission antenna 158. Each radio transmission process includes digital-to-analog conversion, frequency band up-conversion, power amplification, and the like.

The transmission antennas 151 through 158 radio-output the transmitted signals acquired from the RF sections 141 through 148 respectively. The receiving antenna 161 receives a radio signal outputted by the mobile station 200 or 300, and outputs it to the RF section 162. A part or the whole of the transmission antennas 151 through 158 may also function as a receiving antenna. In this case, the radio base station 100 may include an antenna sharing device for separating a transmitted signal and a received signal.

The RF section 162 performs a radio receiving process on the received signal acquired from the receiving antenna 161, and outputs a signal (time domain signal) obtained to the FFT section 163. The radio receiving process includes frequency band down-conversion, power amplification, analog-to-digital conversion, and the like.

The FFT section 163 performs a Fourier transform on the time domain signal acquired from the RF section 162, and obtains a frequency domain signal. For example, the FFT section 163 performs a first Fourier transform (FFT). However, the FFT section 163 may use a transform algorithm other than an FFT. The FFT section 163 then outputs the frequency domain signal (modulated signal) obtained to the demodulation section 164.

The demodulation section 164 demodulates the modulated signal acquired from the FFT section 163 by the use of a determined scheme or a scheme selected according to the communication state of the mobile station 200 or 300. The demodulation section 164 outputs coded data and coded information obtained to the decoding section 165.

The decoding section 165 performs error-correction decoding on the coded data and the coded information acquired from the demodulation section 164 by the use of a determined scheme or a scheme selected according to the communication state of the mobile station 200 or 300. If the decoding section 165 fails in performing an error correction, the decoding section 165 may request the mobile station 200 or 300 to retransmit the radio signal. By doing so, user data and control information transmitted from the mobile station 200 or 300 are extracted. Control information which can be extracted includes a CSI which is feedback information from the mobile station 200 or 300. If the decoding section 165 extracts a CSI, then the decoding section 165 outputs it to the scheduler 132.

Figure 4:
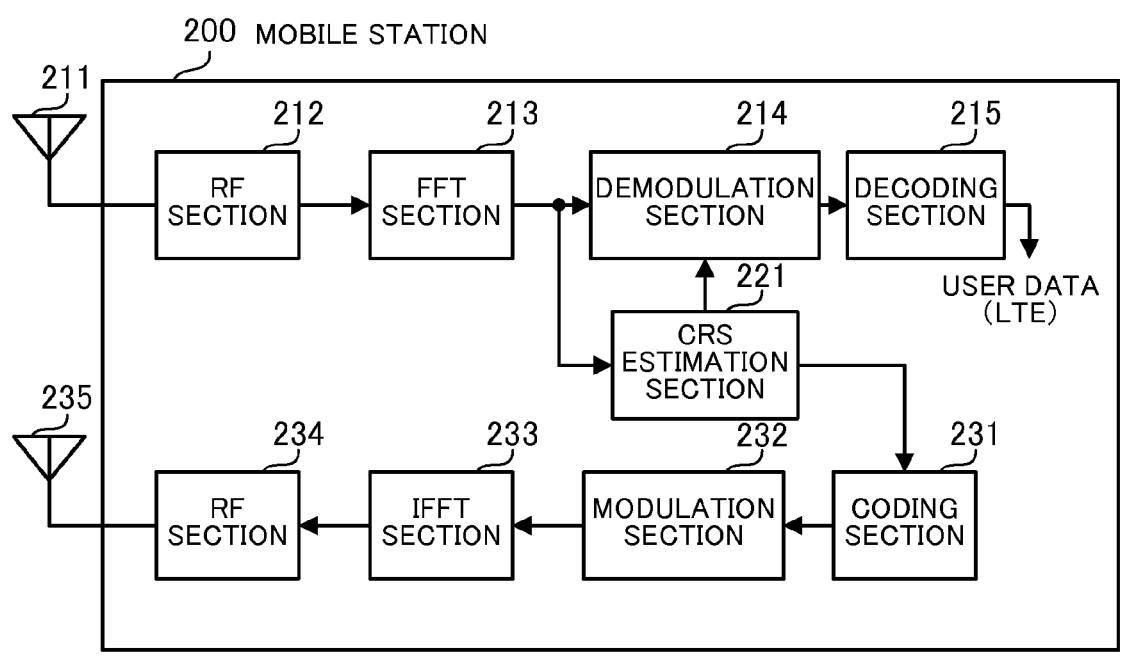
FIG. 4 is a block diagram of a first mobile station.

FIG. 4 is a block diagram of a first mobile station. The mobile station 200 includes a receiving antenna 211, an RF section 212, an FFT section 213, a demodulation section 214, a decoding section 215, a CRS estimation section 221, a coding section 231, a modulation section 232, an IFFT section 233, an RF section 234, and a transmission antenna 235.

The receiving antenna 211 receives a radio signal outputted by the radio base station 100, and outputs it to the RF section 212. The RF section 212 performs a radio receiving process on the received signal acquired from the receiving antenna 211, and outputs a signal (time domain signal) obtained to the FFT section 213.

The FFT section 213 performs a Fourier transform on the time domain signal acquired from the RF section 212, and obtains a frequency domain signal. For example, the FFT section 213 performs an FFT. However, the FFT section 213 may use a transform algorithm other than an FFT. The FFT section 213 then outputs the frequency domain signal (modulated signal) obtained to the demodulation section 214 and the CRS estimation section 221.

The demodulation section 214 demodulates the modulated signal acquired from the FFT section 213 by the use of a determined scheme or a scheme selected according to the communication state of the mobile station 200. Notice of a modulation scheme adopted for modulating user data may be given by control information. If the CRS estimation section 221 gives the demodulation section 214 notice of an estimation result obtained by the use of a CRS, then the demodulation section 214 uses the estimation result (performs channel compensation, for example) for demodulating the modulated signal. The demodulation section 214 outputs coded data obtained to the decoding section 215.

The decoding section 215 performs error-correction decoding on the coded data acquired from the demodulation section 214 by the use of a determined scheme or a scheme selected according to the communication state of the mobile station 200. Notice of a coding scheme adopted for coding the user data may be given by the control information. If the decoding section 215 fails in performing an error correction, the decoding section 215 may request the radio base station 100 to retransmit the radio signal. By doing so, the user data a destination of which is the mobile station 200 is extracted. The mobile station 200 performs data processing, such as voice reproduction and image display, on the user data extracted.

On the basis of the signal acquired from the FFT section 213, the CRS estimation section 221 performs an estimation process such as channel estimation or coherent detection. To be concrete, the CRS estimation section 221 extracts a signal in a region by which the CRSes for the ports #0 through #3 are to be transmitted from the received signal. The CRS estimation section 221 then performs an estimation process on the basis of the extracted signal and known CRSes. The CRS estimation section 221 generates a CSI from an estimation result and outputs it as control information to the coding section 231. In addition, the CRS estimation section 221 gives the demodulation section 214 notice of the estimation result.

The CRS estimation section 221 performs the above estimation process for each of the ports #0 through #3. That is to say, the CRS estimation section 221 recognizes each of a pair of the transmission antennas 151 and 152 of the radio base station 100, a pair of the transmission antennas 153 and 154 of the radio base station 100, a pair of the transmission antennas 155 and 156 of the radio base station 100, and a pair of the transmission antennas 157 and 158 of the radio base station 100 as a virtual transmission antenna.

When the coding section 231 acquires the control information to be transmitted to the radio base station 100, the coding section 231 performs error-correction coding on the control information by the use of a determined coding scheme or a coding scheme selected according to the communication state of the mobile station 200. The control information to be transmitted to the radio base station 100 includes the CSI acquired from the CRS estimation section 221. The coding section 231 outputs coded information obtained to the modulation section 232.

The modulation section 232 digital-modulates the coded information acquired from the coding section 231 by the use of a determined modulation scheme or a modulation scheme selected according to the communication state of the mobile station 200. The modulation section 232 then outputs a modulated signal obtained to the IFFT section 233.

The IFFT section 233 maps the modulated signal acquired from the modulation section 232 to a frequency domain. The IFFT section 233 then performs an inverse Fourier transform on the frequency domain signal to generate a time domain signal. For example, the IFFT section 233 performs an IFFT. However, the IFFT section 233 may use a transform algorithm other than an IFFT. The IFFT section 233 then outputs the signal obtained to the RF section 234.

The RF section 234 performs a radio transmission process on the signal after the IFFT acquired from the IFFT section 233, and outputs a signal obtained to the transmission antenna 235. The radio transmission process includes digital-to-analog conversion, frequency band up-conversion, power amplification, and the like. The transmission antenna 235 radio-outputs the transmitted signal acquired from the RF section 234. An antenna which functions both as a receiving antenna and as a transmission antenna may be used. In this case, the mobile station 200 may include an antenna sharing device for separating a transmitted signal and a received signal.

Figure 5:
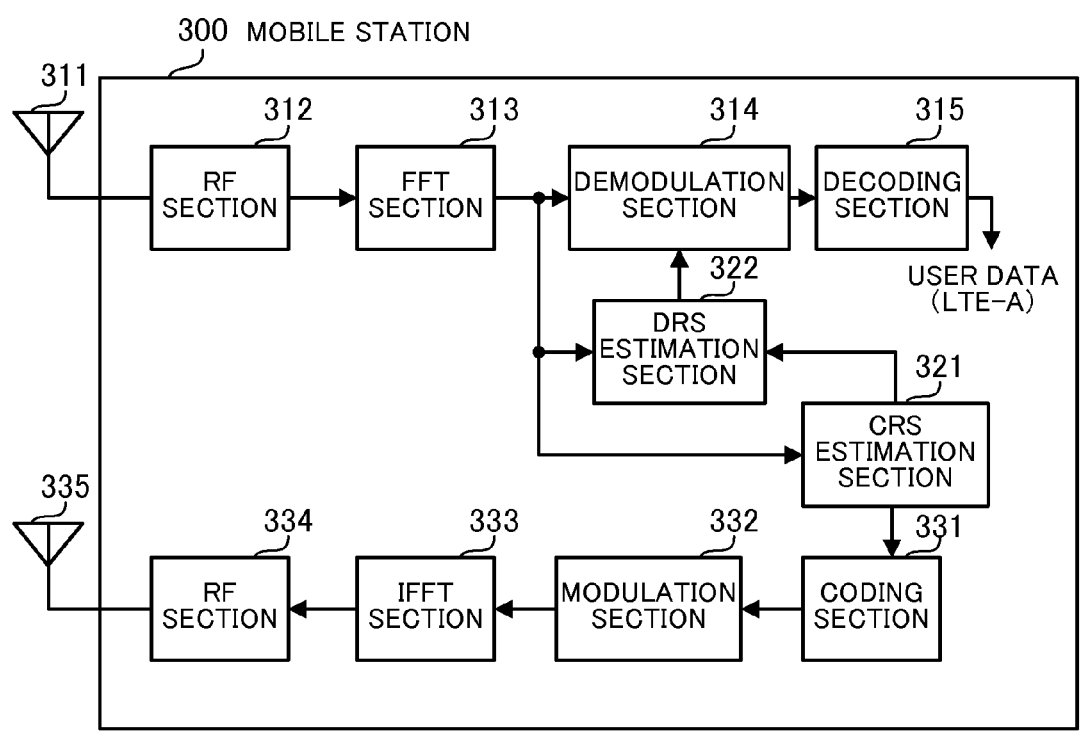
FIG. 5 is a block diagram of a second mobile station.

FIG. 5 is a block diagram of a second mobile station. The mobile station 300 includes a receiving antenna 311, an RF section 312, an FFT section 313, a demodulation section 314, a decoding section 315, a CRS estimation section 321, a DRS estimation section 322, a coding section 331, a modulation section 332, an IFFT section 333, an RF section 334, and a transmission antenna 335. The operation of the components other than the demodulation section 314, the CRS estimation section 321, and the DRS estimation section 322 is the same as that of the components of the above mobile station 200 having the same names, so descriptions of them will be omitted.

The demodulation section 314 demodulates a modulated signal acquired from the FFT section 313 by the use of a determined scheme or a scheme selected according to the communication state of the mobile station 300. If the DRS estimation section 322 gives the demodulation section 314 notice of an estimation result obtained by the use of a DRS, then the demodulation section 314 uses the estimation result (performs channel compensation, for example) for demodulating the modulated signal.

On the basis of the signal acquired from the FFT section 313, the CRS estimation section 321 performs an estimation process such as channel estimation or coherent detection. To be concrete, the CRS estimation section 321 extracts a signal in a region by which the CRSes for the ports #0 through #7 are to be transmitted from a received signal. The CRS estimation section 321 then performs an estimation process on the basis of the extracted signal and known CRSes. The CRS estimation section 321 generates a CSI from an estimation result and outputs it as control information to the coding section 331. In addition, the CRS estimation section 321 gives the DRS estimation section 322 notice of the estimation result.

On the basis of the signal acquired from the FFT section 313 and the estimation result notice of which the CRS estimation section 321 gives the DRS estimation section 322, the DRS estimation section 322 performs an estimation process such as channel estimation or coherent detection. To be concrete, the DRS estimation section 322 extracts a signal in a region by which the DRS is to be transmitted from the received signal. The DRS estimation section 322 then performs an estimation process on the basis of the extracted signal, a known DRS, and the CRS estimation result. The DRS estimation section 322 gives the demodulation section 314 notice of an estimation result.

The DRS estimation section 322 performs an estimation process on the basis of the DRS at the time of receiving user data a destination of which is the mobile station 300. By using the DRS, accuracy in estimation at user data receiving time can be improved compared with the case where only a CRS is used. Furthermore, by referring to the CRS estimation result, accuracy in estimating the DRS can be improved.

Each of the CRS estimation section 321 and the DRS estimation section 322 performs the above estimation process for each of the ports #0 through #7. That is to say, each of the CRS estimation section 321 and the DRS estimation section 322 separately recognizes the transmission antennas 151 through 158 of the radio base station 100.

Figure 6:
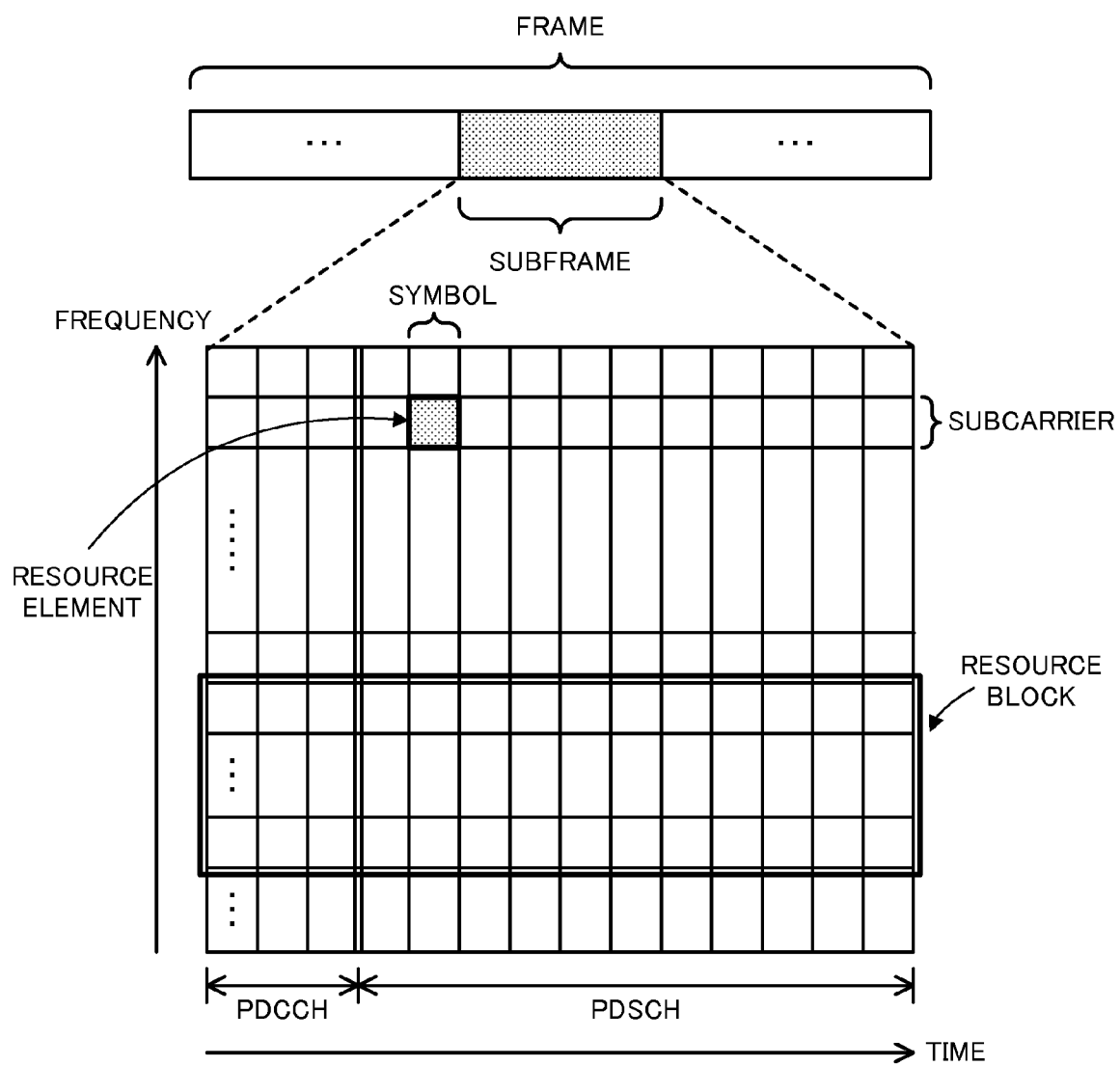
FIG. 6 illustrates the structure of a frame.

FIG. 6 illustrates the structure of a frame. An OFDM (Orthogonal Frequency Division Multiplexing) frame like that illustrated in FIG. 6 is radio-transmitted from the radio base station 100 to the mobile station 200 or 300.

One frame includes a plurality of (ten, for example) subframes. In each subframe a resource region including the time axis and the frequency axis is subdivided and managed. A minimum unit in the time direction is referred to as a symbol. A minimum unit in the frequency direction is referred to as a subcarrier. The minimum unit of a radio resource specified by (1 symbol)×(1 subcarrier) is referred to as a resource element. A radio resource corresponding to a plurality of subcarriers included in one subframe is assigned to the mobile station 200 or 300 as a resource block. That is to say, a resource is assigned to the mobile station 200 or 300 by the resource block.

One resource block includes a PDCCH (Physical Downlink Control Channel), which is a control channel, and a PDSCH (Physical Downlink Shared Channel), which is a data channel, as physical layer channels. In the example of FIG. 6, one subframe includes fourteen symbols, the first three symbols are assigned as a PDCCH region, and the remaining eleven symbols are assigned as a PDSCH region.

The frame structure illustrated in FIG. 6 is an example. The radio base station 100 may perform radio communication with the mobile station 200 or 300 by the use of a frame having a structure other than the above structure. For example, the number of symbols assigned to a control channel or the position of a control channel may be changed.

Figure 7:
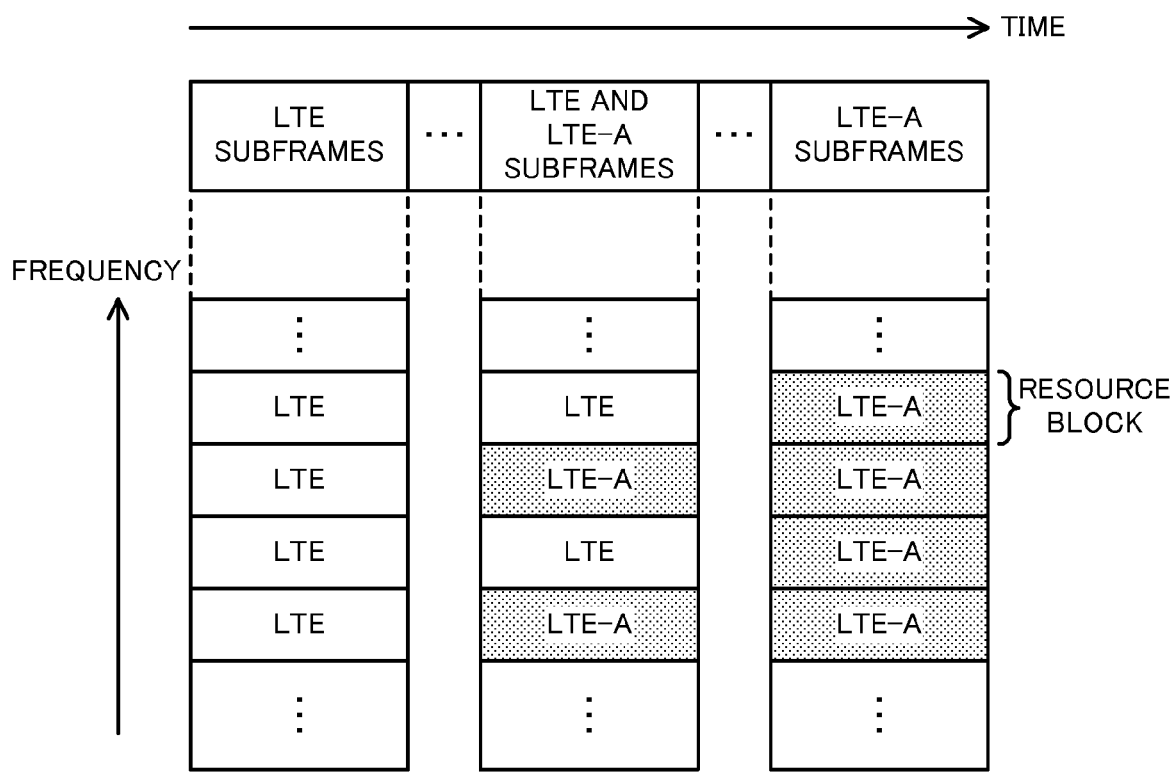
FIG. 7 illustrates subframe types.

FIG. 7 illustrates subframe types. Subframes transmitted by the radio base station 100 can be classed under three types from the result of the assignment of a resource block to the mobile station 200 or 300. A first type of subframe is an LTE subframe which does not include a resource block assigned to the mobile station 300 based on the LTE-A standard. A second type of subframe is an LTE and LTE-A subframe in which resource blocks assigned to the mobile station 200 based on the LTE standard and resource blocks assigned to the mobile station 300 based on the LTE-A standard mingle. A third type of subframe is an LTE-A subframe which does not include a resource block assigned to the mobile station 200 based on the LTE standard.

The radio base station 100 can adopt various control methods for assigning a resource block. For example, the radio base station 100 can assign a resource block without taking the type of each mobile station (whether each mobile station is based on the LTE standard or the LTE-A standard) into consideration. In this case, the number of LTE and LTE-A subframes may increase. On the other hand, the radio base station 100 may exercise control so that the number of LTE subframes or LTE-A subframes will increase. That is to say, the radio base station 100 may exercise control so as to collect resource blocks assigned to mobile stations of the same type in the same subframe as many as possible. In addition, a subframe at determined timing may always be set as a determined type.

Furthermore, the radio base station 100 may change a CRS transmission method according to the type of a subframe or may transmit a CRS without taking the type of a subframe into consideration. In the former case, the radio base station 100 may exercise control, for example, so as to transmit the CRSes for the ports #0 through #3 by the use of an LTE subframe and so as not to transmit the CRSes for the ports #4 through #7 by the use of an LTE subframe. The reason for this is that the mobile station 200 based on the LTE standard does not refer to the CRSes for the ports #4 through #7. The case where both the CRSes for the ports #0 through #3 and the CRSes for the ports #4 through #7 are transmitted will now be described.

The transmission antenna 151 outputs the CRSes for the ports #0 and #4 by the use of two resource elements. The transmission antenna 152 paired with the transmission antenna 151 outputs the CRSes for the ports #0 and #4 by the use of the same two resource elements that the transmission antenna 151 uses for outputting the CRSes for the ports #0 and #4. That is to say, a CRS outputted by the transmission antenna 151 and a CRS outputted by the transmission antenna 152 are superimposed in each of the above two resource elements. Two CRSes superimposed may be the same signal or different signals. It is possible that one of the transmission antennas 151 and 152 does not transmit the CRS (CRS=0) for the port #4.

Similarly, the transmission antenna 153 outputs the CRSes for the ports #1 and #5 by the use of two resource elements. The transmission antenna 154 paired with the transmission antenna 153 outputs the CRSes for the ports #1 and #5 by the use of the same two resource elements that the transmission antenna 153 uses for outputting the CRSes for the ports #1 and #5. However, it is possible that one of the transmission antennas 153 and 154 does not transmit the CRS for the port #5.

The transmission antenna 155 outputs the CRSes for the ports #2 and #6 by the use of two resource elements. The transmission antenna 156 paired with the transmission antenna 155 outputs the CRSes for the ports #2 and #6 by the use of the same two resource elements that the transmission antenna 155 uses for outputting the CRSes for the ports #2 and #6. However, it is possible that one of the transmission antennas 155 and 156 does not transmit the CRS for the port #6.

The transmission antenna 157 outputs the CRSes for the ports #3 and #7 by the use of two resource elements. The transmission antenna 158 paired with the transmission antenna 157 outputs the CRSes for the ports #3 and #7 by the use of the same two resource elements that the transmission antenna 157 uses for outputting the CRSes for the ports #3 and #7. However, it is possible that one of the transmission antennas 157 and 158 does not transmit the CRS for the port #7.

The relative positions of a pair of CRSes (CRSes for the ports #0 and #4, for example) outputted by each of the transmission antennas 151 through 158 will now be described. In the following description the CRSes outputted in particular by each of the transmission antennas 151 and 152 will be discussed.

Figure 8A:
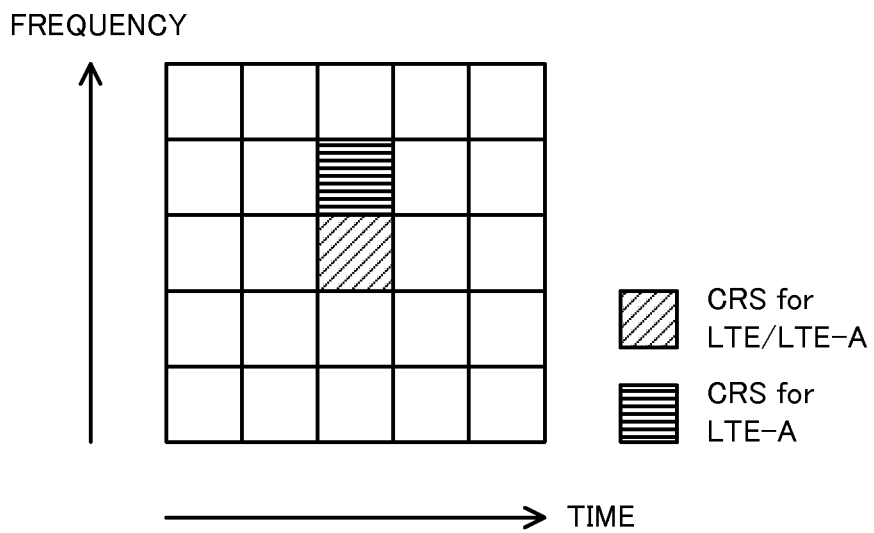
FIGS. 8A and 8B illustrate a first policy for the arrangement of CRSes.
Figure 8B:
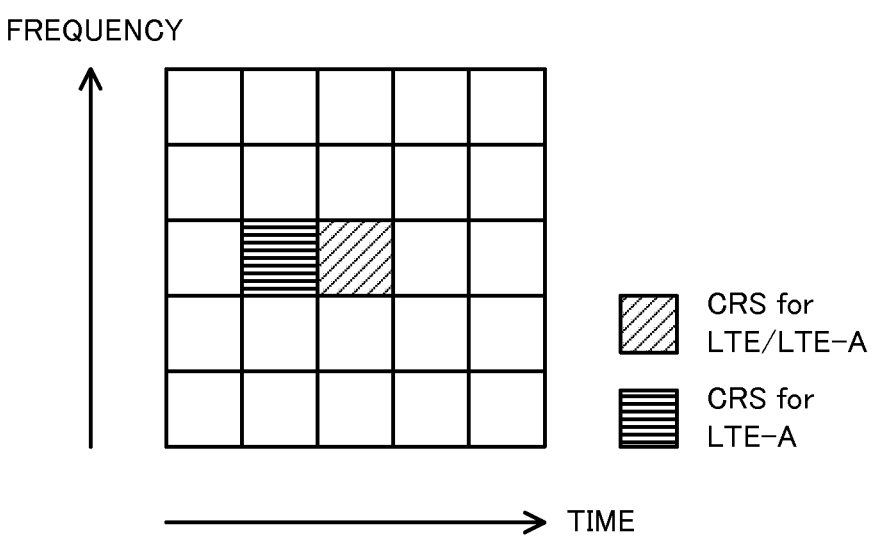

FIGS. 8A and 8B illustrate a first policy for the arrangement of CRSes. FIG. 8A illustrates the policy of assigning the CRSes for the ports #0 and #4 to two resource elements adjacent to each other on the frequency axis. On the other hand, FIG. 8B illustrates the policy of assigning the CRSes for the ports #0 and #4 to two resource elements adjacent to each other on the time axis.

In the example of FIG. 8A, the CRS for the port #0, that is to say, the CRS referred to both by the mobile station 200 based on the LTE standard and by the mobile station 300 based on the LTE-A standard is arranged in a determined resource element (first region). In addition, the CRS for the port #4, that is to say, the CRS referred to by the mobile station 300 based on the LTE-A standard is arranged in a resource element (second region) that is included in the same symbol where the first region is included and that is higher in frequency than the first region by one. However, it is possible to use a resource element in a subcarrier that is lower in frequency than the first region by one as a second region.

In the example of FIG. 8B, the CRS for the port #0 is arranged in a determined resource element (first region). In addition, the CRS for the port #4 is arranged in a resource element (second region) that is included in the same subcarrier where the first region is included and that is included in a symbol which is one before the first region. However, it is possible to use a resource element in a symbol which is one after the first region as a second region.

In the above examples of FIGS. 8A and 8B, the first region is adjacent to the second region. However, the first region and the second region may be placed so that the distance between them will be within a determined range. For example, if a resource element one resource element distant from the first region cannot be used, then a resource element two resource elements distant from the first region may be used as the second region. For a reason described later, however, it is desirable that the first region and the second region should be as close to each other as possible.

The CRSes outputted by the transmission antennas 153 through 158 can be arranged in accordance with the same policy that is adopted for arranging the CRSes outputted by the transmission antennas 151 and 152. From the viewpoint of accuracy in channel estimation, however, it is desirable that the transmission antennas 153 through 158 should not transmit signals (including user data signals and control information signals) by the use of the resource elements in which the transmission antennas 151 and 152 arrange the CRSes. The policy illustrated in FIG. 8A can also be referred to as an FDM (Frequency Division Multiplexing) approach and the policy illustrated in FIG. 8B can also be referred to as a TDM (Time Division Multiplexing) approach.

Figure 9A:
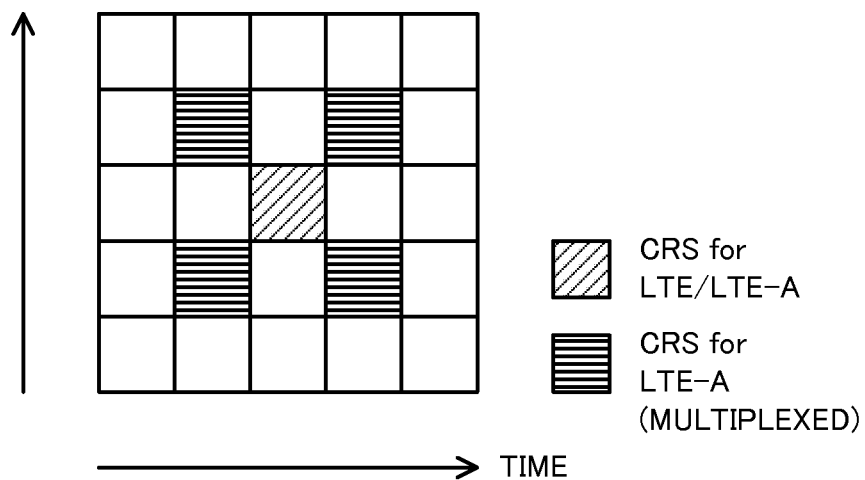
FIGS. 9A and 9B illustrate a second policy for the arrangement of CRSes.
Figure 9B:
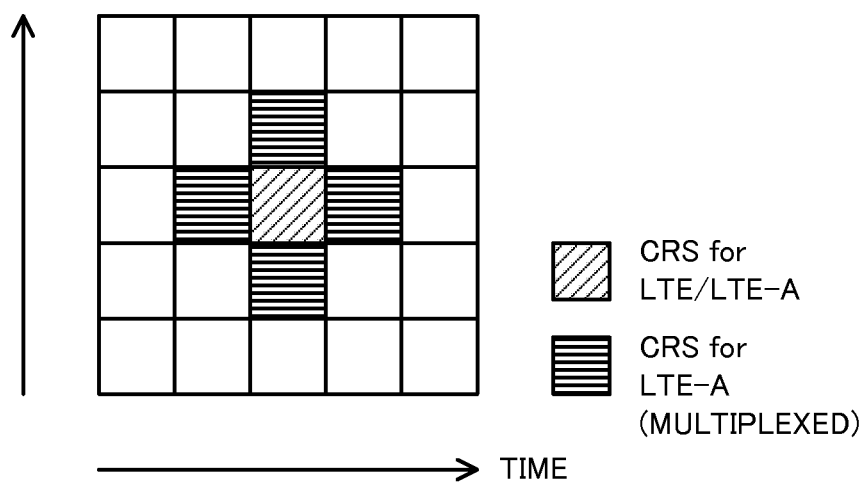

FIGS. 9A and 9B illustrate a second policy for the arrangement of CRSes. FIG. 9A illustrates the policy of assigning four resource elements (1 symbol×1 subcarrier) distant from a resource element (first region) in which the CRS for the port #0 is arranged to a region (second region) in which the CRS for the port #4 is arranged. FIG. 9B illustrates the policy of assigning four resource elements adjacent to a resource element (first region) in which the CRS for the port #0 is arranged to a region (second region) in which the CRS for the port #4 is arranged.

If a plurality of resource elements which are in close vicinity to the first region are used in this way as the second region, code multiplexing can be performed. That is to say, by diffusing the CRS by the use of a diffusion code, each resource element used for transmitting the CRS for the port #4 can also be used for transmitting another CRS or a user data signal. Accordingly, the transmission antennas 153 through 158 can use the above four resource elements.

In the above examples of FIGS. 9A and 9B, the first region is adjacent to the second region in the time direction, the frequency direction, or an oblique direction. As stated above, however, the first region and the second region may be placed so that the distance between them will be within a determined range. For example, a resource element two or more resource elements distant from the first region may be used as the second region. However, it is desirable that the first region and the second region should be as close to each other as possible.

The policy of superimposing the CRS and a CRS outputted from another transmission antenna can also be referred to as a CDM (Code Division Multiplexing) approach. The policy of superimposing the CRS and a data signal outputted from another transmission antenna can also be referred to as a superposition approach. The CRSes outputted by the transmission antennas 153 through 158 can be arranged in accordance with the same policy that is adopted for arranging the CRSes outputted by the transmission antennas 151 and 152.

Figure 10A:
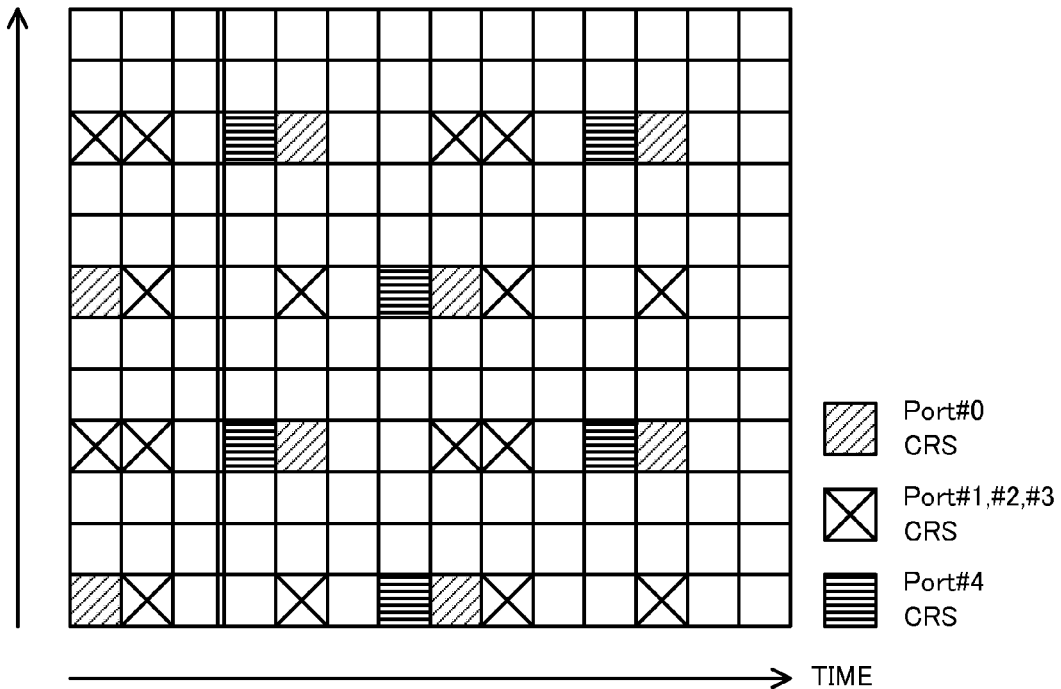
FIGS. 10A and 10B illustrate a first example of the arrangement of CRSes.
Figure 10B:
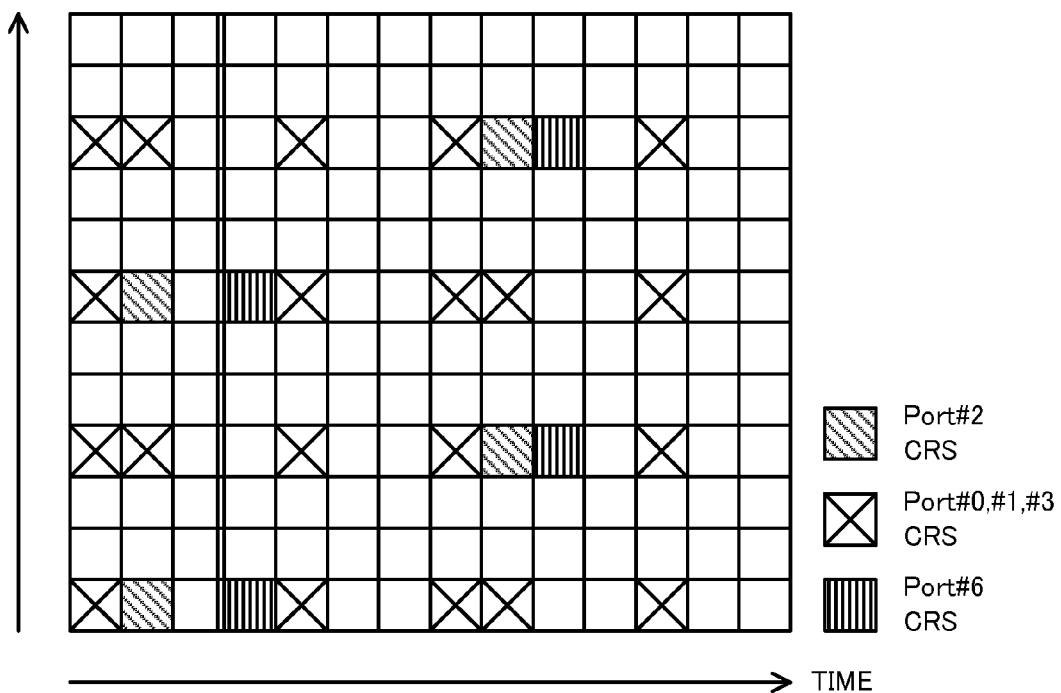

FIGS. 10A and 10B illustrates a first example of the arrangement of CRSes. In the example of FIGS. 10A and 10B, CRSes are arranged in a resource block in accordance with the policy illustrated in FIG. 8B. In the example of FIG. 10A, the CRSes outputted by the transmission antennas 151 and 152 are arranged. In the example of FIG. 10B, the CRSes outputted by the transmission antennas 155 and 156 are arranged.

In the example of FIG. 10A, two resource elements in the PDCCH region and six resource elements in the PDSCH region are assigned to the CRS for the port #0. In addition, six resource elements in the PDSCH region are assigned to the CRS for the port #4. The above two types of resource elements are adjacent to each other on the time axis in the PDSCH region.

The example of FIG. 10A indicates that a resource element used for transmitting the CRS for the port #1, #2, or #3 is not used by the transmission antenna 151 or 152. Similarly, a resource element used for transmitting the CRS for the port #5, #6, or #7 may not be used by the transmission antenna 151 or 152. Furthermore, in the example of FIG. 10A the CRS for the port #4 is not arranged in the PDCCH region. However, the CRS for the port #4 may be arranged in the PDCCH region.

In the example of FIG. 10B, two resource elements in the PDCCH region and two resource elements in the PDSCH region are assigned to the CRS for the port #2. In addition, four resource elements in the PDSCH region are assigned to the CRS for the port #6. The above two types of resource elements are adjacent to each other on the time axis in the PDSCH region.

The example of FIG. 10B indicates that a resource element used for transmitting the CRS for the port #0, #1, or #3 is not used by the transmission antenna 155 or 156. Similarly, a resource element used for transmitting the CRS for the port #4, #5, or #7 may not be used by the transmission antenna 155 or 156. Furthermore, in the example of FIG. 10B the CRS for the port #6 is arranged not in the PDCCH region but in resource elements in the PDSCH region nearest the CRS in the PDCCH region. However, the CRS for the port #6 may be arranged not in the PDCCH region.

As illustrated in the above examples of FIGS. 10A and 10B, the number of resource elements in the resource block used for transmitting CRSes may differ between transmission antennas. In the above examples, the number of the resource elements used for transmitting the CRSes outputted by the transmission antennas 151 and 152 is greater than that of the resource elements used for transmitting the CRSes outputted by the transmission antennas 155 and 156. In addition, the CRSes for the ports #4 through #7 may be arranged outside the PDCCH region.

Figure 11A:
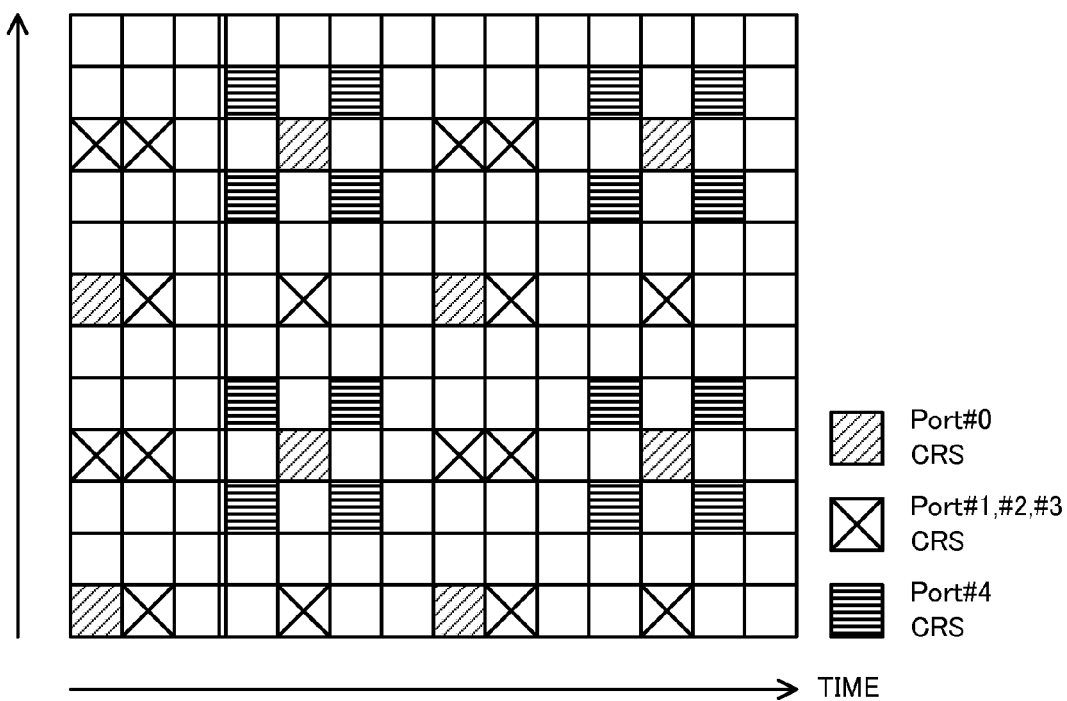
FIGS. 11A and 11B illustrate a second example of the arrangement of CRSes.
Figure 11B:
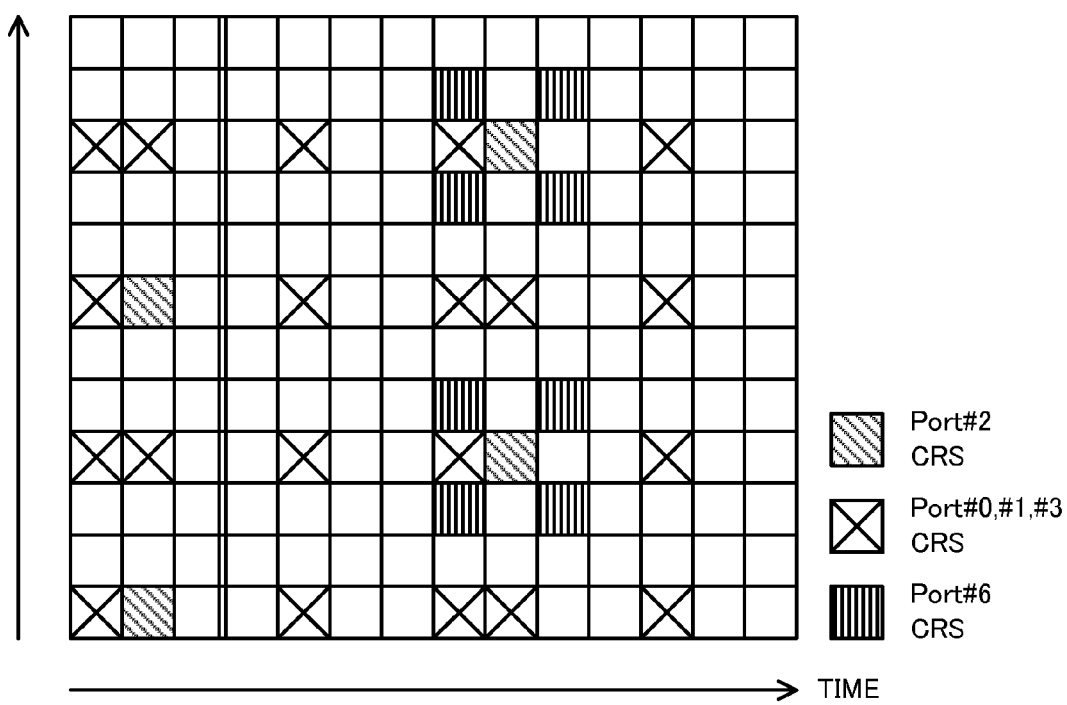

FIGS. 11A and 11B illustrates a second example of the arrangement of CRSes. In the example of FIGS. 11A and 11B, CRSes are arranged in a resource block in accordance with the policy illustrated in FIG. 9A. In the example of FIG. 11A, the CRSes outputted by the transmission antennas 151 and 152 are arranged. In the example of FIG. 11B, the CRSes outputted by the transmission antennas 155 and 156 are arranged.

In the example of FIG. 11A, two resource elements in the PDCCH region and six resource elements in the PDSCH region are assigned to the CRS for the port #0. In addition, sixteen resource elements in the PDSCH region are assigned to the CRS for the port #4.

The example of FIG. 11A indicates that a resource element used for transmitting the CRS for the port #1, #2, or #3 is not used by the transmission antenna 151 or 152. On the other hand, a resource element used for transmitting the CRS for the port #5, #6, or #7 may also be used for transmitting another CRS or a user data signal by code multiplexing. Furthermore, in the example of FIG. 11(A) the CRS for the port #4 is not arranged in the PDCCH region. This is the same with FIG. 10. However, the CRS for the port #4 may be arranged in the PDCCH region.

In addition, in the example of FIG. 11A the resource elements used for transmitting the CRS for the port #4 are additionally placed near four resource elements of the six resource elements in the PDSCH region used for transmitting the CRS for the port #0. The reason for this is to prevent the number of resource elements in which the CRS for the port #4 is arranged from excessively increasing. However, resource elements used for transmitting the CRS for the port #4 may be placed near all of the six resource elements used for transmitting the CRS for the port #0.

In the example of FIG. 11B, two resource elements in the PDCCH region and two resource elements in the PDSCH region are assigned to the CRS for the port #2. In addition, eight resource elements in the PDSCH region are assigned to the CRS for the port #6.

The example of FIG. 11B indicates that a resource element used for transmitting the CRS for the port #0, #1, or #3 is not used by the transmission antenna 155 or 156. On the other hand, a resource element used for transmitting the CRS for the port #4, #5, or #7 may also be used for transmitting another CRS or a user data signal by code multiplexing. Furthermore, in the example of FIG. 11B the CRS for the port #6 is not arranged in the PDCCH region. This is the same with FIG. 10. However, the CRS for the port #6 may be arranged in the PDCCH region.

As illustrated in the above examples of FIGS. 11A and 11B, the number of resource elements in the resource block used for transmitting CRSes may differ between transmission antennas. In addition, the CRSes for the ports #4 through #7 may be arranged outside the PDCCH region. Furthermore, if there are too many CRSes (for example, if the number or ratio of resource elements in a resource block used for transmitting CRSes exceeds a determined threshold), the number of resource elements used for transmitting the CRSes may be reduced.

The reason why it is desirable to arrange the CRS for the port #4, #5, #6, or #7 near the CRS for the port #0, #1, #2, or #3 will now be described. In the following description a pair of the transmission antennas 151 and 152 will be discussed. The same applies to another transmission antenna pair.

It is assumed that the CRS for the port #0 outputted by the transmission antenna 151 is represented as the complex number $\alpha_0$, that the CRS for the port #0 outputted by the transmission antenna 151 is represented as the complex number $\alpha_1$, that the CRS for the port #4 outputted by the transmission antenna 152 is represented as the complex number $\beta_0$, and that the CRS for the port #4 outputted by the transmission antenna 152 is represented as the complex number $\beta_1$. In addition, it is assumed that $\alpha_0$ and $\alpha_1$ are transmitted by the use of a subcarrier k and a symbol l and that $\beta_0$ and $\beta_1$ are transmitted by the use of a subcarrier (k+m) and a symbol (l+n) (m and n are integers and are not zero).

In this case, a signal r(k, l) which the mobile station 300 receives by the use of the subcarrier k and the symbol l and a signal r(k+m, l+n) which the mobile station 300 receives by the use of the subcarrier (k+m) and the symbol (l+n) are defined as follows:

$$r(k,l) = \alpha_0 h_0(k,l) + \alpha_1 h_1 + \eta(k,l) \quad (1\text{-}1)$$

$$r(k+m, l+n) = \beta_0 h_0(k+m, l+n) + \beta_1 h_1(k+m, l+n) + \eta(k+m, l+n) \quad (1\text{-}2)$$

where $h_0$ is a channel state for the transmission antenna 151, $h_1$ is a channel state for the transmission antenna 152, and $\eta$ is white Gauss noise.

If m and n are sufficiently small, that is to say, if two resource elements are sufficiently close to each other, then it may safely be said that channel states for the two resource elements are approximately equal. That is to say, the following approximate expressions can be obtained.

$$h_0(k,l) \approx h_0(k+m, l+n) \quad (2\text{-}1)$$

$$h_1(k,l) \approx h_1(k+m, l+n) \quad (2\text{-}2)$$

It is assumed that $\alpha_0$, $\alpha_1$, $\beta_0$, and $\beta_1$ are give by (3)

$$\alpha_0 = \alpha_1 = \beta_0 = 1, \beta_1 = 0 \quad (3)$$

That is to say, it is assumed that all of the CRS for the port #0 and the CRS for the port #4 outputted by the transmission antenna 151 and the CRS for the port #0 outputted by the transmission antenna 152 are the same signal and that the transmission antenna 152 does not output the CRS for the port #4.

By applying the above expressions (2-1), (2-2), and (3) to expressions (1-1) and (1-2), the following approximate expression for the differential between the signals received by the use of the two resource elements can be obtained.

$$r(k,l) - r(k+m, l+n) \approx h_1(k,l) + \eta(k,l) - \eta(k+m, l+n) \quad (4)$$

The mobile station 300 can estimate the channel state $h_1$ for the transmission antenna 152 by the above expression (4). The mobile station 300 can calculate the channel state $h_0$ for the transmission antenna 151 by the use of the result of estimating the channel state $h_1$. However, if one of the transmission antennas 151 and 152 does not transmit the CRS for the port #4 as indicated by the above expression (3), then there may be a difference between the receiving levels of the signals which the mobile station 300 receives by the use of the two resource elements. For example, there may be a difference of about 3 dB in SNR (Signal to Noise Ratio).

On the other hand, it is assumed that $\alpha_0$, $\alpha_1$, $\beta_0$, and $\beta_1$ are give by $$\beta_0 = \alpha_1^*, \beta_1 = -\alpha_0^* \quad (5)$$

where * means a complex conjugate operation. In order to secure a sufficient signal level, it is desirable to make the absolute values of $\alpha_0$, $\alpha_1$, $\beta_0$, and $\beta_1$ one. For example, it is possible to assume that $\alpha_0 = \alpha_1 = \beta_0 = 1$ and that $\beta_1 = -1$. Expression (5) can be derived on the basis of the concept of an STC (Space Time Code). For example, the following document refers to the STC.

S. M. Alamouti, "A Simple Transmit Diversity Technique for Wireless Communications", IEEE Journal on Select Areas in Communications, vol. 16, No. 8, pp. 1451-1458, October 1998.

By applying the above expressions (2-1), (2-2), and (5) to expression (1-2), the following approximate expression for the signal r(k+m, l+n) received by the use of the subcarrier (k+m) and the symbol (l+n) can be obtained.

$$r(k+m, l+n) \approx \alpha_1^* h_0(k,l) - \alpha_0^* h_1(k,l) + \eta(k+m, l+n) \quad (6)$$

That is to say, on the basis of the above expressions (1-1) and (6), the mobile station 300 can estimate the channel states $h_0$ and $h_1$ from the signal r(k, l) and the signal r(k+m, l+n) it receives. For example, the mobile station 300 can use the following expressions as linear expressions for channel estimation.

$$\hat{h}_0(k,l) = \frac{1}{|\alpha_0|^2 + |\alpha_1|^2}(\alpha_0^* r(k,l) + \alpha_1 r(k+m, l+n)) \quad (7\text{-}1)$$

$$\hat{h}_1(k,l) = \frac{1}{|\alpha_0|^2 + |\alpha_1|^2}(\alpha_1^* r(k,l) - \alpha_0 r(k+m, l+n)) \quad (7\text{-}2)$$

Expression (7-1) is used for calculating a channel response value for the transmission antenna 151 and expression (7-2) is used for calculating a channel response value for the transmission antenna 152.

The correspondence between the above expressions (7-1) and (7-2) for channel state estimation and actual channel states are given by:

$$\hat{h}_0(k,l) = h_0(k,l) + \frac{1}{|\alpha_0|^2 + |\alpha_1|^2}(\alpha_0^* \eta(k,l) + \alpha_1 \eta(k+m, l+n)) \quad (8\text{-}1)$$

$$\hat{h}_1(k,l) = h_1(k,l) + \frac{1}{|\alpha_0|^2 + |\alpha_1|^2}(\alpha_1^* \eta(k,l) - \alpha_0 \eta(k+m, l+n)) \quad (8\text{-}2)$$

As indicated by expressions (8-1) and (8-2), the above expressions (7-1) and (7-2) express the actual channel states without noise components.

As has been described, by arranging the CRS for the port #0 and the CRS for the port #4 in resource elements close to each other, the mobile station 300 can perform estimation with accuracy.

In the above description control is exercised so that the two transmission antennas 151 and 152 will look like one virtual transmission antenna from the mobile station 200. However, the above description can be generalized so that it can be applied to another virtual antenna mapping method. For example, generalized virtual antenna mapping can be defined as $$\sum_{i=0}^{I-1} \alpha_{j,i} h_i(k+m_i, l+n_i) \quad (9)$$

where $\alpha_{j,i}$ indicates a jth virtual transmission antenna and i=0, 1, ..., and 7 indicate the physical transmission antennas 151 through 158. With the mobile station 200 based on the LTE standard, the case where j=0, 1, 2, or 3 should be discussed. With the mobile station 300 based on the LTE-A standard, on the other hand, the case where j=0, 1, ..., or 7 should be discussed.

The radio base station 100 may perform CDD. That is to say, even if the same CRSes are originally outputted from the transmission antennas 151 and 152, they can intentionally be transmitted at different timings (that is to say, a CRS outputted from one transmission antenna can be phase-rotated on the frequency domain). If the radio base station 100 performs CDD, the mobile station 200 or 300 can obtain frequency diversity gain.

In addition, the mobile station 200 or 300 can change a received signal use method according to the object of an estimation process. For example, if the object is to generate a CSI, the mobile station 200 or 300 may use the statistical value of a region used for transmitting a CSR. That is to say, the mobile station 200 or 300 finds an average for a plurality of regions in a certain interval (one subframe or one frame, for example) and performs an estimation process by the use of the average. On the other hand, if the object is to demodulate user data, the mobile station 200 or 300 may use an instantaneous received signal. That is to say, the mobile station 200 or 300 performs demodulation by the use of only the result of estimating a CSR in a region close to a region to which a user data signal is assigned.

The flow of a transmission process performed by the radio base station 100 and the flow of a receiving process performed by the mobile station 200 or 300 will now be described.

FIG. 12 is a flow chart of a transmission process performed by the radio base station. The transmission process illustrated in FIG. 12 is performed repeatedly by the radio base station 100. The contents of the process will now be described in detail in order of step number.

(Step S11) The scheduler 132 refers to a CSI fed back from the mobile station 200 or 300, and performs scheduling of various transmitted signals such as a user data signal and a control information signal. However, a fixed resource may be used for transmitting a CRS. The scheduler 132 may perform this scheduling after the generation of transmitted signals in the following step S12.

(Step S12) The radio base station 100 generates transmitted signals. To be concrete, the whole or a part of subprocesses indicated in steps S121 through S128 below are performed.

(Step S121) The coding section 111 performs error-correction coding on user data a destination of which is the mobile station 200 based on the LTE standard.

(Step S122) The modulation section 112 digital-modulates the user data the destination of which is the mobile station 200 based on the LTE standard. The subprocess in step S121 or S122 can be performed in parallel with another subprocess (subprocess in step S123, S124, S125, S126, S127, or S128).

(Step S123) The coding section 113 performs error-correction coding on user data a destination of which is the mobile station 300 based on the LTE-A standard.

(Step S124) The modulation section 114 digital-modulates the user data the destination of which is the mobile station 300 based on the LTE-A standard. The subprocess in step S123 or S124 can be performed in parallel with another subprocess (subprocess in step S121, S122, S125, S126, S127, or S128).

(Step S125) The coding section 115 performs error-correction coding on control information destinations of which are the mobile stations 200 and 300.

(Step S126) The modulation section 116 digital-modulates the control information the destinations of which are the mobile stations 200 and 300. The subprocess in step S125 or S126 can be performed in parallel with another subprocess (subprocess in step S121, S122, S123, S124, S127, or S128).

(Step S127) The CRS generation section 122 generates a CRS for each of the ports #0 through #7. However, there may be no need for the CRS generation section 122 to generate a CRS for a part of the ports #0 through #7, depending on the type of a subframe. The subprocess in step S127 can be performed in parallel with another subprocess (subprocess in step S121, S122, S123, S124, S125, S126, or S128).

(Step S128) The DRS generation section 121 generates a DRS. However, there is no need for the DRS generation section 121 to generate a DRS for a subframe by which user data a destination of which is the mobile station 300 is not transmitted. The subprocess in step S128 can be performed in parallel with another subprocess (subprocess in step S121, S122, S123, S124, S125, S126, or S127).

(Step S13) The multiplexing and IFFT section 131 maps the transmitted signals generated in step S12 to an OFDM frame according to a scheduling result obtained in step S11.

(Step S14) The multiplexing and IFFT section 131 performs an IFFT on the transmitted signals mapped in step S13.

(Step S15) The RF sections 141 through 148 perform radio transmission processes on the signals on which an IFFT has been performed in step S14. The RF sections 141 through 148 then output radio signals obtained from the transmission antennas 151 through 158 respectively.

Figure 13:
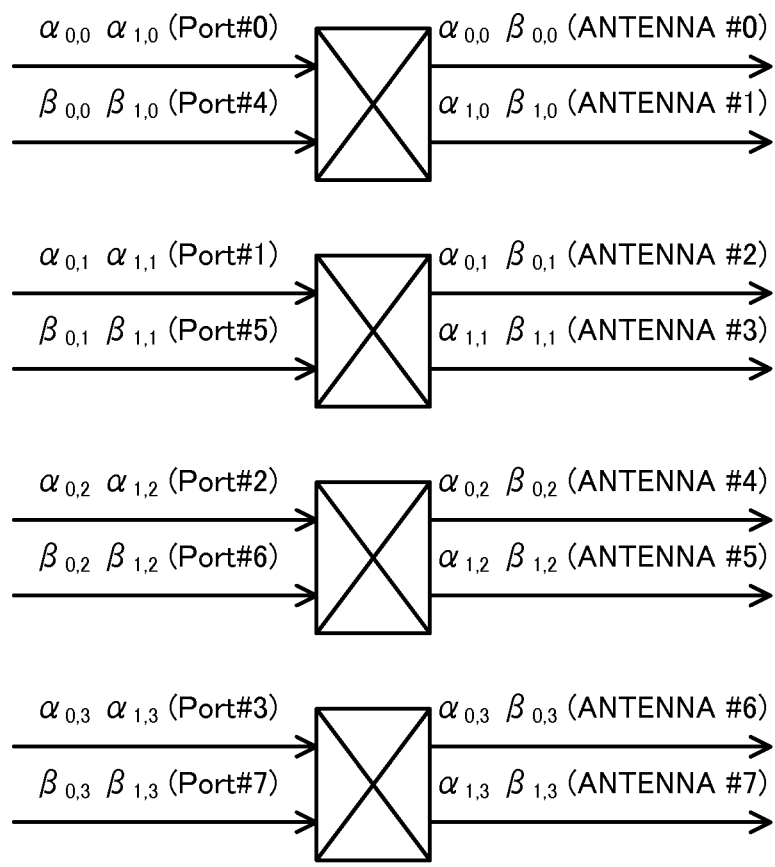
FIG. 13 illustrates the correspondence between CRSes and transmission antennas.

FIG. 13 illustrates the correspondence between the CRSes and the transmission antennas. FIG. 13 illustrates the correspondence between CRSes generated by the CRS generation section 122 and signals outputted from the transmission antennas 151 through 158.

The CRS generation section 122 generates $\alpha_{0,0}$ and $\alpha_{1,0}$ as CRSes for the port #0. In addition, the CRS generation section 122 generates $\beta_{0,0}$ and $\beta_{1,0}$ as CRSes for the port #4. In this case, the multiplexing and IFFT section 131 maps $\alpha_{0,0}$ and $\beta_{0,0}$ to the transmission antenna 151. Furthermore, the multiplexing and IFFT section 131 maps $\alpha_{1,0}$ and $\beta_{1,0}$ to the transmission antenna 152.

The CRS generation section 122 generates $\alpha_{0,1}$ and $\alpha_{1,1}$ as CRSes for the port #1. In addition, the CRS generation section 122 generates $\beta_{0,1}$ and $\beta_{1,1}$ as CRSes for the port #5. In this case, the multiplexing and IFFT section 131 maps $\alpha_{0,1}$ and $\beta_{0,1}$ to the transmission antenna 153. Furthermore, the multiplexing and IFFT section 131 maps $\alpha_{1,1}$ and $\beta_{1,1}$ to the transmission antenna 154.

The CRS generation section 122 generates $\alpha_{0,2}$ and $\alpha_{1,2}$ as CRSes for the port #2. In addition, the CRS generation section 122 generates $\beta_{0,2}$ and $\beta_{1,2}$ as CRSes for the port #6. In this case, the multiplexing and IFFT section 131 maps $\alpha_{0,2}$ and $\beta_{0,2}$ to the transmission antenna 155. Furthermore, the multiplexing and IFFT section 131 maps $\alpha_{1,2}$ and $\beta_{1,2}$ to the transmission antenna 156.

The CRS generation section 122 generates $\alpha_{0,3}$ and $\alpha_{1,3}$ as CRSes for the port #3. In addition, the CRS generation section 122 generates $\beta_{0,3}$ and $\beta_{1,3}$ as CRSes for the port #7. In this case, the multiplexing and IFFT section 131 maps $\alpha_{0,3}$ and $\beta_{0,3}$ to the transmission antenna 157. Furthermore, the multiplexing and IFFT section 131 maps $\alpha_{1,3}$ and $\beta_{1,3}$ to the transmission antenna 158.

Figure 14:
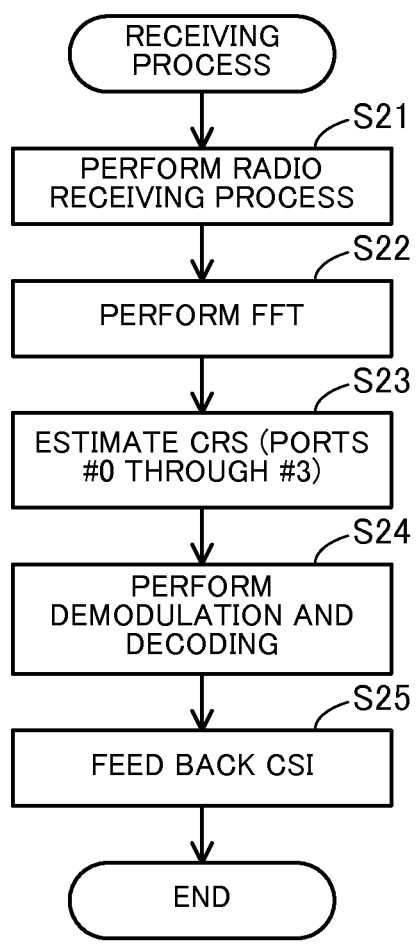
FIG. 14 is a flow chart of a receiving process performed by the first mobile station.

FIG. 14 is a flow chart of a receiving process performed by the first mobile station. The receiving process illustrated in FIG. 14 is performed repeatedly by the mobile station 200 based on the LTE standard. The contents of the process will now be described in detail in order of step number.

(Step S21) The RF section 212 performs a radio receiving process on a radio signal received from the radio base station 100.

(Step S22) The FFT section 213 performs an FFT on the received signal on which the radio receiving process has been performed in step S21.

(Step S23) The CRS estimation section 221 refers to the CRSes for the ports #0 through #3 and performs an estimation process such as channel estimation or coherent detection. There is no need for the CRS estimation section 221 to refer to the CRSes for the ports #4 through #7. That is to say, the CRS estimation section 221 refers to the above $\alpha_{0,0}$, $\alpha_{1,0}$, $\alpha_{0,1}$, $\alpha_{1,1}$, $\alpha_{0,2}$, $\alpha_{1,2}$, $\alpha_{0,3}$, and $\alpha_{1,3}$ and calculates a channel response value for each of the four virtual antennas.

(Step S24) The demodulation section 214 demodulates user data a destination of which is the mobile station 200 by the use of the estimation results obtained in step S23.

(Step S25) On the basis of the estimation results obtained in step S23, the CRS estimation section 221 generates a CSI to be fed back to the radio base station 100. The order of the subprocess in step S24 and the subprocess in step S25 may be reversed. Only one of the subprocess in step S24 and the subprocess in step S25 may be performed.

Figure 15:
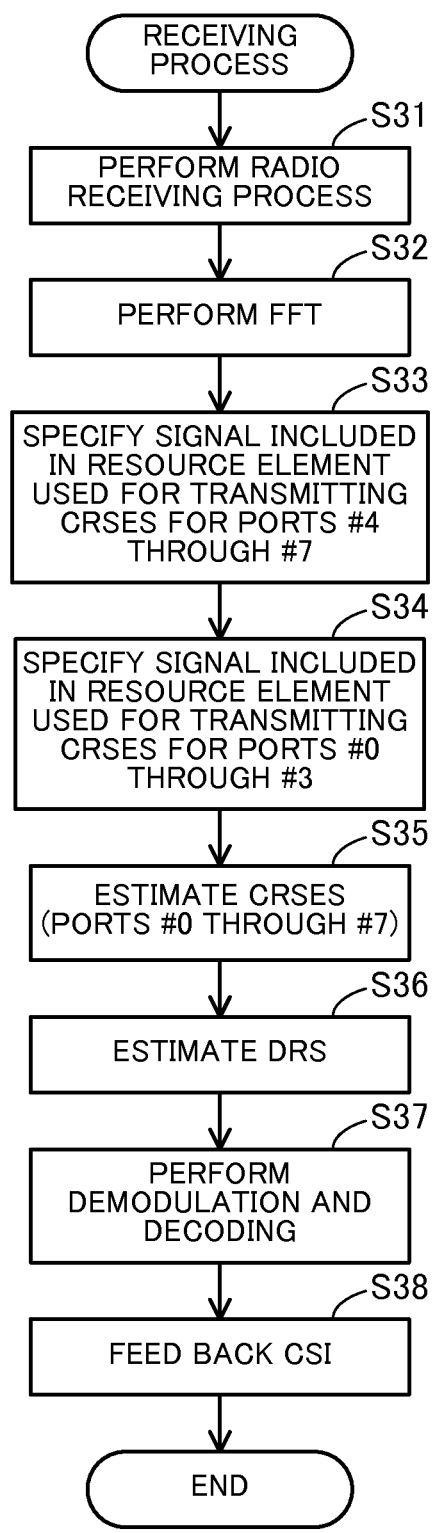
FIG. 15 is a flow chart of a receiving process performed by the second mobile station.

FIG. 15 is a flow chart of a receiving process performed by the second mobile station. The receiving process illustrated in FIG. 15 is performed repeatedly by the mobile station 300 based on the LTE-A standard. The contents of the process will now be described in detail in order of step number.

(Step S31) The RF section 312 performs a radio receiving process on a radio signal received from the radio base station 100.

(Step S32) The FFT section 313 performs an FFT on the received signal on which the radio receiving process has been performed in step S31.

(Step S33) The CRS estimation section 321 specifies a signal included in a resource element used for transmitting the CRSes for the ports #4 through #7. The CRS estimation section 321 may perform various operations on the received signal included in the resource element used for transmitting the CRSes for the ports #4 through #7, for example, if the radio base station 100 performs CDD.

(Step S34) The CRS estimation section 321 specifies a signal included in a resource element used for transmitting the CRSes for the ports #0 through #3. The CRS estimation section 321 may perform various operations on the received signal included in the resource element used for transmitting the CRSes for the ports #0 through #3. This is the same with step S33. The order of the subprocess in step S33 and the subprocess in step S34 may be reversed.

(Step S35) On the basis of the signals specified in steps S33 and S34, the CRS estimation section 321 performs an estimation process such as channel estimation or coherent detection. That is to say, the CRS estimation section 321 refers to the above $\alpha_{0,0}$, $\alpha_{1,0}$, $\alpha_{0,1}$, $\alpha_{1,1}$, $\alpha_{0,2}$, $\alpha_{1,2}$, $\alpha_{0,3}$, $\alpha_{1,3}$, $\beta_{0,0}$, $\beta_{1,0}$, $\beta_{0,1}$, $\beta_{1,1}$, $\beta_{0,2}$, $\beta_{1,2}$, $\beta_{0,3}$, and $\beta_{1,3}$ and calculates a channel response value for each of the eight physical transmission antennas.

(Step S36) The DRS estimation section 322 performs a DRS estimation process by the use of the estimation results (estimation results based on the CRSes) obtained in step S35.

(Step S37) The demodulation section 314 demodulates user data a destination of which is the mobile station 300 by the use of an estimation result (estimation result based on the DRS) obtained in step S36.

(Step S38) On the basis of the estimation results (estimation results based on the CRSes) obtained in step S35, the CRS estimation section 321 generates a CSI to be fed back to the radio base station 100. The subprocess in step S38 may be performed prior to the subprocesses in steps S36 and S37. Furthermore, only the subprocesses in steps S36 and S37 or only the subprocess in step S38 may be performed.

With the mobile telecommunication system according to this embodiment the radio base station 100 can perform radio communication both with the mobile station 200 which is based on the LTE standard and which can recognize not more than four transmission antennas and with the mobile station 300 which is based on the LTE-A standard and which can recognize not more than eight transmission antennas. In this case, there is no need for the radio base station 100 to transmit CRSes separately to the two types of mobile stations.

That is to say, control can be exercised so that the mobile station 200 can estimate a channel response value from a CRS in a first region and that the mobile station 300 can estimate a channel response value from the CRS in first region and a CRS in a second region. In other words, control can be exercised so that the CRS in first region will be referred to by both of the two types of mobile stations. Accordingly, radio resources used for transmitting CRSes can be reduced. This prevents radio resources used for transmitting user data from reducing. As a result, radio resources can be used efficiently.

According to the above transmission apparatus, receiving apparatus, and radio communication method, efficiency in the use of radio resources can be improved at the time of transmitting known signals.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A transmission apparatus for performing radio communication with a first type of receiving apparatus which can detect not more than N transmission antennas from a received signal and a second type of receiving apparatus which can detect more than N transmission antennas from a received signal, where N is an integer greater than or equal to one, the transmission apparatus comprising:

(N+1) or more transmission antennas including a first transmission antenna and a second transmission antenna; and a control section which assigns a radio resource to a signal outputted from each of the (N+1) or more transmission antennas, wherein:

the control section exercises control so as to use a first radio resource for outputting known signals $\alpha_0$ and $\alpha_1$ used by the first type of receiving apparatus and the second type of receiving apparatus from the first transmission antenna and the second transmission antenna and to use a second radio resource for outputting known signals $\beta_0$ and $\beta_1$ used by the second type of receiving apparatus from the first transmission antenna and the second transmission antenna, respectively; and a timing difference between the first radio resource and the second radio resource is smaller than or equal to a first determined difference and a frequency difference between the first radio resource and the second radio resource is smaller than or equal to a second determined difference, wherein the known signal $\alpha_0$ outputted from the first transmission antenna, the known signal $\alpha_1$ outputted from the second transmission antenna, the known signal $\beta_0$ outputted from the first transmission antenna, and the known signal $\beta_1$ outputted from the second transmission antenna satisfy $\beta_0=\alpha_1^*$ and $\beta_1=-\alpha_0^*$, where * indicates a complex conjugate operation.

2. The transmission apparatus according to claim 1, wherein the first radio resource and the second radio resource are adjacent to each other on a time axis or a frequency axis.

3. The transmission apparatus according to claim 1, wherein the known signals $\beta_0$ and $\beta_1$ outputted by the use of the second radio resource and a signal outputted from a transmission antenna other than the first transmission antenna and the second transmission antenna are code-multiplexed.

4. The transmission apparatus according to claim 1, wherein the second radio resource is selected from among radio resources other than a radio resource used as a control channel.

5. The transmission apparatus according to claim 1, wherein the known signals $\beta_0$ and $\beta_1$ are output by the use of the second radio resource only in a transmission interval including data destined for the second type of receiving apparatus.

6. A transmission apparatus for performing radio communication with a first type of receiving apparatus which can detect not more than N transmission antennas from a received signal and a second type of receiving apparatus which can detect more than N transmission antennas from a received signal, where N is an integer greater than or equal to one, the transmission apparatus comprising:

(N+1) or more transmission antennas; and a control section which assigns a radio resource to a signal outputted from each of the (N+1) or more transmission antennas, wherein:

the control section selects M transmission antennas from among the (N+1) or more transmission antennas and exercises control so as to use one of M radio resources for outputting known signals $\alpha_0$ and $\alpha_1$ used by the first type of receiving apparatus and the second type of receiving apparatus from at least a first transmission antenna and a second transmission antenna of the M transmission antennas and to use a remaining (M−1) radio resource resources for outputting known signals $\beta_0$ and $\beta_1$ used by the second type of receiving apparatus from at least the first transmission antenna and the second transmission antenna, respectively of the M transmission antennas, where M is an integer greater than or equal to two; and the M radio resources are within a determined time range and a determined frequency range, wherein the known signal $\alpha_0$ outputted from the first transmission antenna, the known signal $\alpha_1$ outputted from the second transmission antenna, the known signal $\beta_0$ outputted from the first transmission antenna, and the known signal $\beta_1$ outputted from the second transmission antenna satisfy $\beta_0=\alpha_1^*$ and $\beta_1=-\alpha_0^*$, where * indicates a complex conjugate operation.

7. A receiving apparatus for performing radio communication with a transmission apparatus including a first transmission antenna and a second transmission antenna, the receiving apparatus comprising:

a receiving section which receives a radio signal in which known signals $\alpha_0$ and $\alpha_1$ outputted from the first transmission antenna and the second transmission antenna is assigned to a first radio resource and in which known signals $\beta_0$ and $\beta_1$ outputted from the first transmission antenna and the second transmission antenna, respectively is assigned to a second radio resource; and an estimation section which estimates a channel state for each of the first transmission antenna and the second transmission antenna by the use of the signal assigned to the first radio resource and the signal assigned to the second radio resource which are included in the radio signal received by the receiving section, wherein a timing difference between the first radio resource and the second radio resource is smaller than or equal to a first determined difference and a frequency difference between the first radio resource and the second radio resource is smaller than or equal to a second determined difference, wherein the known signal $\alpha_0$ outputted from the first transmission antenna, the known signal $\alpha_1$ outputted from the second transmission antenna, the known signal $\beta_0$ outputted from the first transmission antenna, and the known signal $\beta_1$ outputted from the second transmission antenna satisfy $\beta_0=\alpha_1^*$ and $\beta_1=-\alpha_0^*$, where * indicates a complex conjugate operation.

8. The receiving apparatus according to claim 7, wherein:

a another known signal is included in the radio signal in a transmission interval including data destined for the receiving apparatus; and the estimation section extracts the other known signal by the use of a result of estimating the channel state.

9. A radio communication method for radio communication between a first type of receiving apparatus which can detect not more than N transmission antennas from a received signal and a second type of receiving apparatus which can detect more than N transmission antennas from a received signal and a transmission apparatus, where N is an integer greater than or equal to one, the method comprising:

using, by the transmission apparatus including (N+1) or more transmission antennas including a first transmission antenna and a second transmission antenna, a first radio resource for outputting known signals $\alpha_0$ and $\alpha_1$ from the first transmission antenna and the second transmission antenna and using, by the transmission apparatus including the (N+1) or more transmission antennas including the first transmission antenna and the second transmission antenna, a second radio resource for outputting known signals $\beta_0$ and $\beta_1$ from the first transmission antenna and the second transmission antenna, respectively, a timing difference between the first radio resource and the second radio resource being smaller than or equal to a first determined difference, a frequency difference between the first radio resource and the second radio resource being smaller than or equal to a second determined difference; and estimating, by the first type of receiving apparatus, a channel state by the use of the known signals $\alpha_0$ and $\alpha_1$ outputted by the use of the first radio resource and estimating, by the second type of receiving apparatus, a channel state by the use of the known signals $\beta_0$ and $\beta_1$ outputted by the use of the first radio resource and the second radio resource, wherein the known signal $\alpha_0$ outputted from the first transmission antenna, the known signal $\alpha_1$ outputted from the second transmission antenna, the known signal $\beta_0$ outputted from the first transmission antenna, and the known signal $\beta_1$ outputted from the second transmission antenna satisfy $\beta_0=\alpha_1^*$ and $\beta_1=-\alpha_0^*$, where * indicates a complex conjugate operation.

* * * * *